(12) United States Patent
    Ojala

(10) Patent No.: US 11,272,237 B2
(45) Date of Patent: Mar. 8, 2022

(54) TAILORED VIDEO STREAMING FOR MULTI-DEVICE PRESENTATIONS

(71) Applicant: INTERDIGITAL MADISON PATENT HOLDINGS, SAS, Paris (FR)

(72) Inventor: Pasi Sakari Ojala, Kirkkonummi (FI)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 16/489,296

(22) PCT Filed: Feb. 28, 2018

(86) PCT No.: PCT/US2018/020229
§ 371 (c)(1),
(2) Date: Aug. 27, 2019

(87) PCT Pub. No.: WO2018/164911
PCT Pub. Date: Sep. 13, 2018

(65) Prior Publication Data
US 2020/0007921 A1    Jan. 2, 2020

Related U.S. Application Data

(60) Provisional application No. 62/468,144, filed on Mar. 7, 2017.

(51) Int. Cl.
*H04N 21/41*    (2011.01)
*H04N 13/161*   (2018.01)
(Continued)

(52) U.S. Cl.
CPC ..... *H04N 21/4126* (2013.01); *G06F 3/04842* (2013.01); *H04L 65/4092* (2013.01);
(Continued)

(58) Field of Classification Search
CPC .......... H04N 21/4126; H04N 21/4345; H04N 21/43637; H04N 21/4728; H04N 21/6587;
(Continued)

(56) References Cited

U.S. PATENT DOCUMENTS 5,610,653 A    3/1997 Abecassis
5,892,554 A    4/1999 DiCicco
(Continued)

FOREIGN PATENT DOCUMENTS

CA        2936318         8/2015
CN    101313578 A    11/2008
(Continued)

OTHER PUBLICATIONS

Loungev Films, "HD 1080p—Nature Scenery Video". YouTube link available at: www.youtube.com/watch?v=DQuhA5ZCV9M, published on Jan. 13, 2016, YouTube player's functionality and bitrate disclosed, 3 pages.
(Continued)

*Primary Examiner* — John R Schnurr
(74) *Attorney, Agent, or Firm* — Invention Mine LLC

(57) ABSTRACT

Systems and methods described herein are provided for displaying video content in a multi-device environment where video content may be synchronized between two or more display devices. Video content displayed on one or more of the display devices may be a cropped version (or region of interest) of video content shown on a main display. Some embodiments may make recommendations to determine regions of interest based on contextual cues and user preferences. For some embodiments, a user may indicate a desire to follow a traced object, which may be used to determine regions of interest.

20 Claims, 15 Drawing Sheets

(51) Int. Cl.
*G06F 3/0484* (2013.01)
*H04L 29/06* (2006.01)
*H04N 21/434* (2011.01)
*H04N 21/4363* (2011.01)
*H04N 21/4728* (2011.01)
*H04N 21/6587* (2011.01)
*G06F 3/04842* (2022.01)
*H04L 65/613* (2022.01)

(52) U.S. Cl.
CPC ....... *H04N 13/161* (2018.05); *H04N 21/4345* (2013.01); *H04N 21/43637* (2013.01); *H04N 21/4728* (2013.01); *H04N 21/6587* (2013.01); *H04L 2209/80* (2013.01)

(58) Field of Classification Search
CPC .............. H04N 13/161; G06F 3/04842; H04L 65/4092; H04L 2209/80
See application file for complete search history.

(56) References Cited

U.S. PATENT DOCUMENTS

| | | |
|---|---|---|
| 6,282,713 B1 | 8/2001 | Kitsukawa |
| 6,750,919 B1 | 6/2004 | Rosser |
| 6,973,130 B1 | 12/2005 | Wee |
| 7,079,176 B1 | 7/2006 | Freeman |
| 7,114,174 B1 | 9/2006 | Brooks |
| 7,117,517 B1 | 10/2006 | Milazzo |
| 7,343,617 B1 | 3/2008 | Katcher |
| 7,577,980 B2 | 8/2009 | Kienzle |
| 7,782,344 B2 | 8/2010 | Whittaker |
| 8,055,785 B2 | 11/2011 | Liu |
| 8,243,797 B2 | 8/2012 | Lin |
| 8,331,760 B2 | 12/2012 | Butcher |
| 8,621,000 B2 | 12/2013 | Adimatyam |
| 9,047,236 B2 | 6/2015 | Gigliotti |
| 9,060,187 B2 | 6/2015 | Wu |
| 9,064,313 B2 | 6/2015 | Seshadrinathan |
| 9,137,558 B2 | 9/2015 | Gibbon |
| 9,170,707 B1 | 10/2015 | Laska |
| 9,177,225 B1 | 11/2015 | Cordova-Diba |
| 9,288,545 B2 | 3/2016 | Hill |
| 9,992,553 B2 | 6/2018 | Bennett |
| 10,152,826 B2 | 12/2018 | Saito |
| 2002/0056136 A1 | 5/2002 | Wistendahl |
| 2002/0059588 A1 | 5/2002 | Huber |
| 2002/0065678 A1 | 5/2002 | Peliotis |
| 2002/0120931 A1 | 8/2002 | Huber |
| 2002/0120934 A1 | 8/2002 | Abrahams |
| 2002/0126990 A1 | 9/2002 | Rasmussen |
| 2002/0131511 A1 | 9/2002 | Zenoni |
| 2002/0133817 A1 | 9/2002 | Markel |
| 2002/0147987 A1 | 10/2002 | Reynolds |
| 2002/0174425 A1 | 11/2002 | Markel |
| 2003/0028873 A1 | 2/2003 | Lemmons |
| 2003/0149983 A1 | 8/2003 | Markel |
| 2004/0031062 A1 | 2/2004 | Lemmons |
| 2004/0032495 A1 | 2/2004 | Ortiz |
| 2004/0190779 A1 | 9/2004 | Sarachik |
| 2005/0093976 A1 | 5/2005 | Valleriano |
| 2007/0024706 A1 | 2/2007 | Brannon, Jr. |
| 2007/0077943 A1 | 4/2007 | Hamilla |
| 2007/0086669 A1 | 4/2007 | Berger |
| 2007/0104369 A1 | 5/2007 | Weatherhead |
| 2007/0226761 A1 | 9/2007 | Zalewski |
| 2008/0077965 A1* | 3/2008 | Kamimaki ......... H04N 21/4341 725/105 |
| 2008/0127253 A1 | 5/2008 | Zhang |
| 2008/0225116 A1 | 9/2008 | Kang |
| 2008/0261711 A1 | 10/2008 | Tuxen |
| 2009/0002564 A1 | 1/2009 | Barnhoefer |
| 2009/0003718 A1 | 1/2009 | Liu |
| 2009/0007023 A1 | 1/2009 | Sundstrom |
| 2009/0046152 A1 | 2/2009 | Aman |
| 2009/0217339 A1 | 8/2009 | Kim |
| 2009/0225164 A1 | 9/2009 | Renkis |
| 2009/0276805 A1 | 11/2009 | Andrews, II |
| 2009/0300692 A1 | 12/2009 | Mavlankar |
| 2009/0316795 A1 | 12/2009 | Chui |
| 2009/0322489 A1 | 12/2009 | Jones |
| 2010/0097221 A1 | 4/2010 | Kreiner |
| 2010/0188531 A1 | 7/2010 | Cordes |
| 2010/0232504 A1 | 9/2010 | Feng |
| 2010/0321389 A1 | 12/2010 | Gay |
| 2011/0013836 A1 | 1/2011 | Gefen |
| 2011/0145430 A1 | 6/2011 | Ha |
| 2011/0299832 A1* | 12/2011 | Butcher ........... H04N 21/41407 386/248 |
| 2011/0304772 A1 | 12/2011 | Dasher |
| 2012/0030637 A1 | 2/2012 | Dey |
| 2012/0062732 A1 | 3/2012 | Marman |
| 2012/0072952 A1 | 3/2012 | Vaysman |
| 2012/0078712 A1 | 3/2012 | Fontana |
| 2012/0195574 A1 | 8/2012 | Wallace |
| 2013/0016910 A1 | 1/2013 | Murata |
| 2013/0031582 A1 | 1/2013 | Tinsman |
| 2013/0036442 A1 | 2/2013 | Wingert |
| 2013/0050268 A1 | 2/2013 | Lohrenz |
| 2013/0061262 A1 | 3/2013 | Briggs |
| 2013/0091430 A1 | 4/2013 | Zhai |
| 2013/0091515 A1 | 4/2013 | Sakata |
| 2013/0155106 A1 | 6/2013 | Rolleston |
| 2013/0167062 A1 | 6/2013 | Herring |
| 2013/0312042 A1 | 11/2013 | Shaw |
| 2013/0342539 A1 | 12/2013 | Khan |
| 2014/0026052 A1 | 1/2014 | Thorwirth |
| 2014/0059457 A1 | 2/2014 | Min |
| 2014/0082054 A1 | 3/2014 | Denoual |
| 2014/0089990 A1 | 3/2014 | Van Deventer |
| 2014/0168056 A1 | 6/2014 | Swaminathan |
| 2014/0192204 A1 | 7/2014 | Glazer |
| 2014/0195918 A1 | 7/2014 | Friedlander |
| 2014/0204206 A1 | 7/2014 | Itoi |
| 2014/0204247 A1 | 7/2014 | Bilgen |
| 2014/0210714 A1 | 7/2014 | Kang |
| 2014/0245367 A1 | 8/2014 | Sasaki |
| 2014/0269932 A1 | 9/2014 | Su |
| 2014/0279068 A1 | 9/2014 | Systrom |
| 2014/0280781 A1 | 9/2014 | Gregotski |
| 2014/0282751 A1* | 9/2014 | Lee ................. H04N 21/4104 725/80 |
| 2015/0016504 A1 | 1/2015 | Auyeung |
| 2015/0032901 A1 | 1/2015 | Wang |
| 2015/0062339 A1 | 3/2015 | Ostrom |
| 2015/0070587 A1 | 3/2015 | Emeott |
| 2015/0089023 A1 | 3/2015 | Phillips |
| 2015/0089072 A1 | 3/2015 | Phillips |
| 2015/0104155 A1 | 4/2015 | Bloch |
| 2015/0117229 A1 | 4/2015 | Avudainayagam |
| 2015/0172775 A1 | 6/2015 | Yee |
| 2015/0179219 A1 | 6/2015 | Gao |
| 2015/0201222 A1 | 7/2015 | Mertens |
| 2015/0208103 A1 | 7/2015 | Guntur |
| 2015/0222815 A1* | 8/2015 | Wang ................. H04N 21/233 348/36 |
| 2015/0264096 A1 | 9/2015 | Swaminathan |
| 2015/0268822 A1 | 9/2015 | Waggoner |
| 2015/0296250 A1 | 10/2015 | Casper |
| 2015/0348247 A1 | 12/2015 | McLaughlin |
| 2015/0350659 A1 | 12/2015 | Auyeung |
| 2016/0042496 A1 | 2/2016 | Ichimi |
| 2016/0057494 A1 | 2/2016 | Hwang |
| 2016/0073106 A1 | 3/2016 | Su |
| 2016/0156949 A1 | 6/2016 | Hattori |
| 2016/0165309 A1 | 6/2016 | Van Brandenburg |
| 2016/0217623 A1 | 7/2016 | Singh |
| 2016/0269771 A1 | 9/2016 | Bangma |
| 2016/0306036 A1 | 10/2016 | Johnson |
| 2016/0360172 A1 | 12/2016 | Tao |
| 2016/0360235 A1 | 12/2016 | Ramasubramonian |
| 2016/0364087 A1 | 12/2016 | Thompson |
| 2016/0366454 A1 | 12/2016 | Tatourian |
| 2017/0070735 A1 | 3/2017 | Ramasubramonian |

(56) References Cited

U.S. PATENT DOCUMENTS

| | | | |
|---|---|---|---|
| 2017/0118540 A1 | 4/2017 | Thomas | |
| 2017/0136948 A1 | 5/2017 | Sypitkowski | |
| 2017/0212583 A1 | 7/2017 | Krasadakis | |
| 2017/0236288 A1 | 8/2017 | Sundaresan | |
| 2017/0302719 A1 | 10/2017 | Chen | |
| 2018/0098063 A1 | 4/2018 | Chen | |
| 2019/0320189 A1 | 10/2019 | Cooper | |
| 2020/0014961 A1* | 1/2020 | Ramaswamy | H04N 21/440263 |

FOREIGN PATENT DOCUMENTS

| | | |
|---|---|---|
| CN | 101350923 A | 1/2009 |
| CN | 102939573 A | 2/2013 |
| CN | 104012106 A | 8/2014 |
| CN | 104052788 A | 9/2014 |
| CN | 104220975 A | 12/2014 |
| CN | 105144727 A | 12/2015 |
| CN | 105264904 A | 1/2016 |
| CN | 105373331 A | 3/2016 |
| CN | 106233745 A | 12/2016 |
| EP | 1175785 A1 | 1/2002 |
| EP | 1443768 A1 | 8/2004 |
| EP | 2426645 A1 | 3/2012 |
| EP | 2530675 A2 | 12/2012 |
| EP | 2824883 A1 | 1/2015 |
| EP | 2824885 | 1/2015 |
| EP | 2919471 | 9/2015 |
| EP | 3076672 A1 | 10/2016 |
| EP | 3110160 A1 | 12/2016 |
| EP | 2408196 | 1/2017 |
| JP | 2009207114 | 9/2009 |
| KR | 20160021141 A | 2/2016 |
| WO | 2001018658 A1 | 3/2001 |
| WO | 2010021705 | 2/2010 |
| WO | 2012021246 | 2/2012 |
| WO | 2014057131 | 4/2014 |
| WO | 2014067566 | 5/2014 |
| WO | 2014111423 A1 | 7/2014 |
| WO | 2014190308 A1 | 11/2014 |
| WO | 2015014773 A1 | 2/2015 |
| WO | 2015059194 A1 | 4/2015 |
| WO | 2015130796 | 9/2015 |
| WO | 2015197815 A1 | 12/2015 |
| WO | 2016040833 A1 | 3/2016 |
| WO | 2016098056 A1 | 6/2016 |
| WO | 2017061297 | 4/2017 |
| WO | 2017196670 A1 | 11/2017 |

OTHER PUBLICATIONS

Flowplayer—"Bandwidth Detection". Web Archived dated Dec. 24, 2016. Retrieved from http://web.archive.org/web/20161224034909/http://flash.flowplayer.org/plugins/streaming/bwcheck.html.

International Preliminary Report on Patentability for PCT/US2018/020229 dated Sep. 10, 2019, 12 pages.

Invitation to pay additional Fees for PCT/US2018/020229, issued by the International Searching Authority, and dated Jun. 8, 2018, 14 pages.

International Search Report and Written Opinion of the International Searching Authority for PCT/US2018/020229 dated Jul. 31, 2018, 18 pages.

Brandenburg, R., et., al., "Immersive Second-Screen Experiences Using Hybrid Media Synchronization". Media Synchronization Workshop, (2013), 7 pages.

HBB Next, "Immersive Second Screen Synchronization". HBB Next, Next Generation Hybrid Media, Applications, available at: http://www.mediafutureweek.nl/wp-content/uploads/2014/05/poster_IBC_2013_applications.pdf, (2013), 1 Sage.

Niamut, O.A., et. al., "Live Event Experiences—Interactive Uhdtv on Mobile Devices". IBC2014 Conference, Sep. 11-15, 2014, 8 pages.

Lindgren, P., et., al., "How True, Synchronized Live OTT Can Change the Second Screen and Social TV Game". IBC2016 Conference, Sep. 8-12, 2016, pp. 1-8.

International Organization for Standardization, "Information Technology—Dynamic Adaptive Streaming Over HTTP (DASH), Part 1: Media Presentation Description and Segment Formats". International Standard, ISO/IEC 23009-1, Second Edition, May 15, 2014, 152 pages.

Lavigne, F., "Automatic Video Zooming for Sport Team Video Broadcasting on Smart Phones". Available at: http://tcts.fpms.ac.be/publications/papers/2010/visapp2010_flfcxd.pdf, (2010), 7 pages.

Mavlankar, A., et al., "An Interactive Region-of-Interest Video Streaming System for Online Lecture Viewing". Proceedings of 2010 IEEE 18th International Packet Video Workshop, Dec. 13-14, 2010, pp. 64-71.

International Search Report and the Written Opinion of the International Searching Authority for PCT/US2016/046317, dated Oct. 19, 2016, 11 pages.

International Preliminary Report on Patentability for PCT/US2016/046317 dated Mar. 1, 2018.

Mavlankar, A. et. al., "Video Streaming with Interactive Pan/Tilt/Zoom", Oct. 2009. Available at: http://web.stanford.edu/~bgirod/pdfs/Mavlankar_Girod_Chapter_Oct09.pdf.

Mavlankar, A., et.al., "Optimal Slice Size for Streaming Regions of High Resolution Video with Virtual Pan/Tilt/Zoom Functionality", Jun. 2007. Available at: http://web.stanford.edu/~bgirod/pdfs/MavlankarEUSIPCO07.pdf.

Written Opinion of the International Preliminary Examining Authority for PCT/US2016/053512 dated Aug. 28, 2017.

International Preliminary Report on Patentability, Corrected Version, for PCT/US2016/053512 completed Jan. 15, 2018.

International Preliminary Report on Patentability for PCT/US2016/053512 completed Jan. 15, 2018.

International Search Report and Written Opinion of the International Searching Authority for PCT/US2016/053512, dated Nov. 28, 2016, 10 pages.

Yilmaz, A., et.al., "Object Tracking—A Survey". ACM Computing Surveys, vol. 38, No. 4, Article 13, Dec. 2006, pp. 1-45.

International Organization for Standardization, "Information Technology—Dynamic adaptive Streaming Over HTTP (DASH)—Part 3: Implementation Guidelines/AMD 1: Alignment with ISO/IEC 23009-1:2014 and Extensibility". International Standard, ISO/IEC JTC 1/SC 29N, ISO/IEC TR 23009-3:2014/PDAM1, ISO/IEC JTC 1/SC 29/WG11, No. N15990, Mar. 2, 2016, 49 pages.

International Search Report and Written Opinion of the International Searching Authority for PCT/US2017/040060 dated Sep. 11, 2017, 15 pages.

Wang X., et al., "Multi-Stream Streaming in DASH (Multi-Stream DASH)". Huawei Technology, Ltd., Motion Picture Expert Group (MPEG) Meeting, No. m35885, Feb. 2015, 8 pages.

International Preliminary Report on Patentability for PCT/US2017/040060 dated Jan. 1, 2019.

International Search Report and Written Opinion of the International Searching Authority for PCT/US2017/026388 dated Jul. 24, 2017, 14 Pages.

Written Opinion of the International Preliminary Examining Authority for PCT/US2017/026388 dated Mar. 5, 2018.

International Preliminary Report on Patentability for PCT/US2017/026388 completed on Jul. 12, 2018.

International Search Report and Written Opinion of the International Searching Authority for PCT/US2018/018540 dated Apr. 6, 2018.

Mavlankar, A. et. al., "An Interactive Region-of-Interest Video Streaming System for Online Lecture Viewing". Proceedings of 2010 IEEE 18th International Packet Video Workshop Dec. 13-14, 2010, pp. 64-68.

Written Opinion of the International Preliminary Examining Authority for PCT/US2018/018540 dated Jan. 18, 2019, 7 pages.

International Preliminary Report on Patentability for PCT/US2018/018540 completed Apr. 26, 2019, 7 pages.

Notification of Transmittal of the International Search Report and the Written Opinion of the International Searching Authority, or the Declaration for PCT/US2017/031335 dated Jul. 19, 2017, 16 pages.

(56) References Cited

OTHER PUBLICATIONS

Giladi, A. et. al., "Use Cases for Conveying Source Information". International Organization for Standardization Coding of Moving Pictures and Audio, ISO/IEC JTC1/SC29/WG11, m31594, Oct. 2013, 3 pages.
Liu S., et al, "SVC Inter-Layer Prediction for SVC Bit-Depth Scalability". Joint Video Team of ISO/IEC JTC1/SC29/WG11 and ITU-T SG.1624, No. JVT-X075, Jun. 2007, 12 pages.
International Search Report and Written Opinion of the International Searching Authority for PCT/US2017/041142 dated Oct. 11, 2017.
Written Opinion of the International Preliminary Examining Authority for PCT/US2017/031335 dated Apr. 5, 2018.
Written Opinion of the International Preliminary Examining Authority for PCT/US2017/041142 dated Jun. 20, 2018.
International Preliminary Report on Patentability for PCT/US2017/031335 completed on Jun. 26, 2018.
International Preliminary Report on Patentability for PCT/US2017/041142 completed on Sep. 19, 2018.
Mantiuk, R., el al., "Display Adaptive Tone Mapping". ACM Transactions on Graphics (TOG), vol. 27, No. 3, Aug. 2008, available at: http://resources.mpi-inf.mpg.de/hdr/datmo/mantiuk08datm.pdf, 10 pages.
Unifore Security, "What's ROI (Region of Interest) Video Surveillance Technology?". Unifore.net, Oct. 23, 2015, 4 pages.
Mavlankar, A., el al., "Peer-To-Peer Multicast Live Video Streaming with Interactive Virtual Pan/Tilt/Zoom Functionality". In 2008 15th IEEE International Conference on Image Processing, Oct. 2008, pp. 2296-2299.
Chen, Y., et. al., "Intra-and-Inter-Constraint-Based Video Enhancement Based on Piecewise Tone Mapping". IEEE Transactions on Circuits and Systems for Video Technology, vol. 23, No. 1, Jan. 2013, pp. 74-82.
Vehkaperä, J., et. al., "Replacing Picture Regions in H. 264/AVC Bitstream by Utilizing Independent Slices". Proceedings of 2010 IEEE 17th International Conference on Image Processing, Sep. 26-29, 2010, pp. 3397-3400.
Classxteam, "ClassX Mobile". You Tube Link, published on May 8, 2011, available at: https://www.youtube.com/watch?v=KuloCw4hj8.
International Telecommunication Union, "Advanced Video Coding for Generic Audiovisual Services". Series H: Audiovisual and Multimedia Systems, ITU-T, H.264, Feb. 2014, 790 pages.
Ubuntu, "Display Adaptive Tone Mapping". Ubuntu Manuals, available at: <http://manpages.ubuntu.com/manpages/xenial/en/man1/pfstmo_mantiuk08.1.html, (2010), 7pages.
Richardson, Iain E., et. al., "The H.264 Advanced Video Compression Standard, Chapter 10: Extensions and Directions". John Wiley, Second Edition, (2010), pp. 287-311.

IBC, "D-ZERO—Low Latency ABR Streaming". Sky Italia, available at: http://www.ibc.org/ibc-awards/ibc2016-innovation-award-entrants/ibc-innovation-award-for-content-delivery-2016-entrants, Sep. 2016.
IBC, "True live OTT Solution Puts F1 in Pole Position". Tata Communications, available at: http://www.ibc.org/ibc-awards/ibc2016-innovation-award-entrants/ibc-innovation-award-for-content-delivery-2016-entrants, Sep. 2016.
SYE, "SYE". Web Archive dated Sep. 5, 2016, available at: https://netinsight.net/start/technical-offer-sye/, 1 page.
International Organization for Standardization, "Information Technology—Dynamic Adaptive Streaming Over HTTP (DASH), Part 1: Media Presentation Description and Segment Formats/ Amendments 2: Spatial Relationship Description, Generalized URL Parameters and Other Extensions". International Standard, ISO/IEC 23009-1:2015/FDAM 2:2015(E), Second Edition (Annex H), Feb. 25, 2015, 23 pages.
Sun, Lei, et. al., "The Dynamic Videobook: A Hierarchical Summarization for Surveillance Video". IEEE International Conference on Image Processing, (2013), pp. 3963-3966.
Tatacomms . "Transforming media + entertainment (subtitles)". Youtube link dated Sep. 10, 2015, available at: https://w,w.youtube.com/watch?v=KUxxPYocMiw, 19 pages.
Tata Communications, "Media and Entertainment Services". Tata Communications, Archived on Feb. 27, 2017. Retrieved from https://web.archive.org/web/20170217212843/https://www.tatacommunications.com/products-services/enterprises/media-entertainment-services, 1 page.
Shibata, F., et. al., "A View Management Method for Mobile Mixed Reality Systems". In Virtual Environments 2008: 14th Eurographics Symposium on Virtual Env., May 29-30, 2008, 8 pages.
International Search Report and Written Opinion of the International Searching Authority for PCT/US2017/043248 dated Oct. 5, 2017.
Written Opinion of the International Preliminary Examining Authority for PCT/US2017/043248 dated Jun. 28, 2018.
International Preliminary Report on Patentability for PCT/US2017/043248 completed Sep. 27, 2018.
Taylor, T. "NFL using Zebra RFID Chips to Track Player Movements, Gather Data". Sports Illustrated article, available at: http://web.archive.org/web20160703053654/http://www.si.com:80/, updated Mar. 6, 2015, 4 pages.
Zebra, "Zebra and the NFL: Change the Game". Zebra.com article, available at: http://web.archive.org/web/20160604013821/https://www.zebra.com/us/en/nfl.html, web archive dated Jun. 4, 2016, 4 pages.
Sheikh Y., et. al., "Geodetic Alignment of Aerial Video Frames". In Shah M., Kumar R. (eds) Video Registration, Chapter 7, (2003), pp. 141-177.
"Nascar Pointer Screen Capture", retrieved from video available at: http://www.sportvision.com/media/pointers, on Jul. 8, 2016, 1 page.
Aberdeen, "Case Study: FCC Challenges Video Editors to Make Room for Caption Placement", Aug. 4, 2015, 3 pages.

* cited by examiner

TAILORED VIDEO STREAMING FOR MULTI-DEVICE PRESENTATIONS

CROSS-REFERENCE TO RELATED APPLICATIONS

This application is a national stage application under 35 U.S.C. 371 of International Application No. PCT/US2018/020229, entitled "TAILORED VIDEO STREAMING FOR MULTI-DEVICE PRESENTATIONS," filed on Feb. 28, 2018, which claims benefit under 35 U.S.C. § 119(e) from U.S. Provisional Patent Application Ser. No. 62/468,144, entitled "TAILORED VIDEO STREAMING FOR MULTI-DEVICE PRESENTATIONS," filed Mar. 7, 2017, which is incorporated herein by reference in its entirety.

BACKGROUND

Smart TV devices, such as home media entertainment hubs, set top boxes (STBs), and applications that stream content to a TV, are growing toward taking a central role in home entertainment. However, sometimes a TV may be used merely as a display for presenting content from user devices that stream content from the web. Some TV applications and external dongles enable web browsing and streaming content from traditional sources, such as YouTube and ISP content services.

For example, there exist applications that enable replication of TV content on tablets and smart phones. The tablet user has the ability to watch a TV program from a different room than one in which the TV is located. Multi-device uses that involve a TV mainly relate to browsing the internet with tablets and finding social media feeds, such as Twitter or Facebook, related to an ongoing program. However, previous applications, did not provide consumers with additional content or information because the TV content is merely replicated on a user device. When consumers use different media channels to find additional information, they may easily be distracted and shift interest to other content sources found on the Internet. Thus, the TV content providers can lose viewers who connect (or are already connected) to other services.

Conversely, some video content, for example the At Bat program created by Major League Baseball (MLB), use multiple internet feeds by integrating social media (e.g., Twitter) with other content. Unfortunately, user devices accessing content in parallel over a broadband connection may have issues with synchronizing TV content and other Internet streams. For example, when the multiple feed technique was used during the 2016 NBA Finals to provide user devices with custom content views of a basketball game, many users experienced more than 30 seconds of delay between the TV and mobile broadcasts. This sort of delay can sour the user experience for some users.

SUMMARY

Systems and methods described herein are provided for displaying video content in a multi-device environment where video content may be synchronized between two or more display devices. Video content displayed on one or more of the display devices may be a cropped version (or region of interest) of video content shown on a main display. Some embodiments may use a recommendation engine to determine regions of interest based on contextual cues and user preferences. For some embodiments, a user may indicate a desire to follow a traced object, which may be used to determine regions of interest. A device for sharing media may comprise a receiver, a display, a processor, and non-transitory computer-readable medium that stores instructions that are operative, when executed by the processor, to perform the method of any of the methods disclosed herein.

A method of sharing media may comprise receiving a primary video stream at a first node, the first node being, for example, a smart TV, a set top box (STB), or a video hub. The primary video stream comprises information regarding at least one region of interest; the method further includes displaying a first portion of the primary video stream on a first display; constructing a first tailored content stream from the primary video stream for a first one of the at least one region of interest, the first tailored content stream different than the displayed portion of the primary video stream; transmitting the first tailored content stream to a second display device different than the first display. Tailored content streams may correspond to a cropped portion of the displayed primary video stream, and may have a different resolution than the displayed primary video stream. A tailored content stream may be transmitted to be synchronized with the primary video stream, and occur over a wireless local area network (LAN) in a Universal Plug and Play (UPnP) protocol or Digital Living Network Alliance (DLNA) protocol. Tailored content streams may also have digital rights management (DRM) security protections.

Multiple tailored video streams may be constructed. For example, a second tailored content stream may be constructed from the primary video stream for a second region of interest that is different than the first region of interest, such that the second tailored content stream is different than both the first tailored content stream and the displayed portion of the primary video stream. The second tailored content stream is then transmitted to a third display device that is different than the first display and the second display device. A tailored content stream may comprise an external content stream reference within the primary video stream. Indications of multiple options for tailored video streams may be displayed.

A region of interest may be extracted from the primary video stream at the first node, or may be indicated in metadata received within the primary video stream. The received metadata may comprise sensor and context data related to the first video stream, for example sensor data corresponding to an object to be traced within the primary video stream. Based on the information related to local context and user preferences received from a display device, a recommendation engine may recommend a region of interest. A request to follow a traced object may be received from a display device, and a region of interest may then comprise a cropped portion of the primary video stream that includes the traced object.

BRIEF DESCRIPTION OF THE DRAWINGS

A more detailed understanding may be had from the following description, presented by way of example in conjunction with the accompanying drawings. Furthermore, like reference numerals in the figures indicate like elements.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." For brevity and clarity of presentation, this implied leading clause is not repeated ad nauseum in the detailed description of the drawings.

DETAILED DESCRIPTION

Some embodiments of systems and methods described herein may provide a method for a smart TV to interact with peripheral user devices connected to the smart TV. As a result, a smart TV may be in a center control position for media consumption. A content owner and a distributor may improve the user experience for a multi-device architecture of connected devices with additional content streams, additional meta data and personalized viewing experiences targeted to individual personal devices interacting with the smart TV. The smart TV processes content and communicates to users different viewpoints and tailored content in different channels by communicating alternative content to connected devices.

Figure 1:
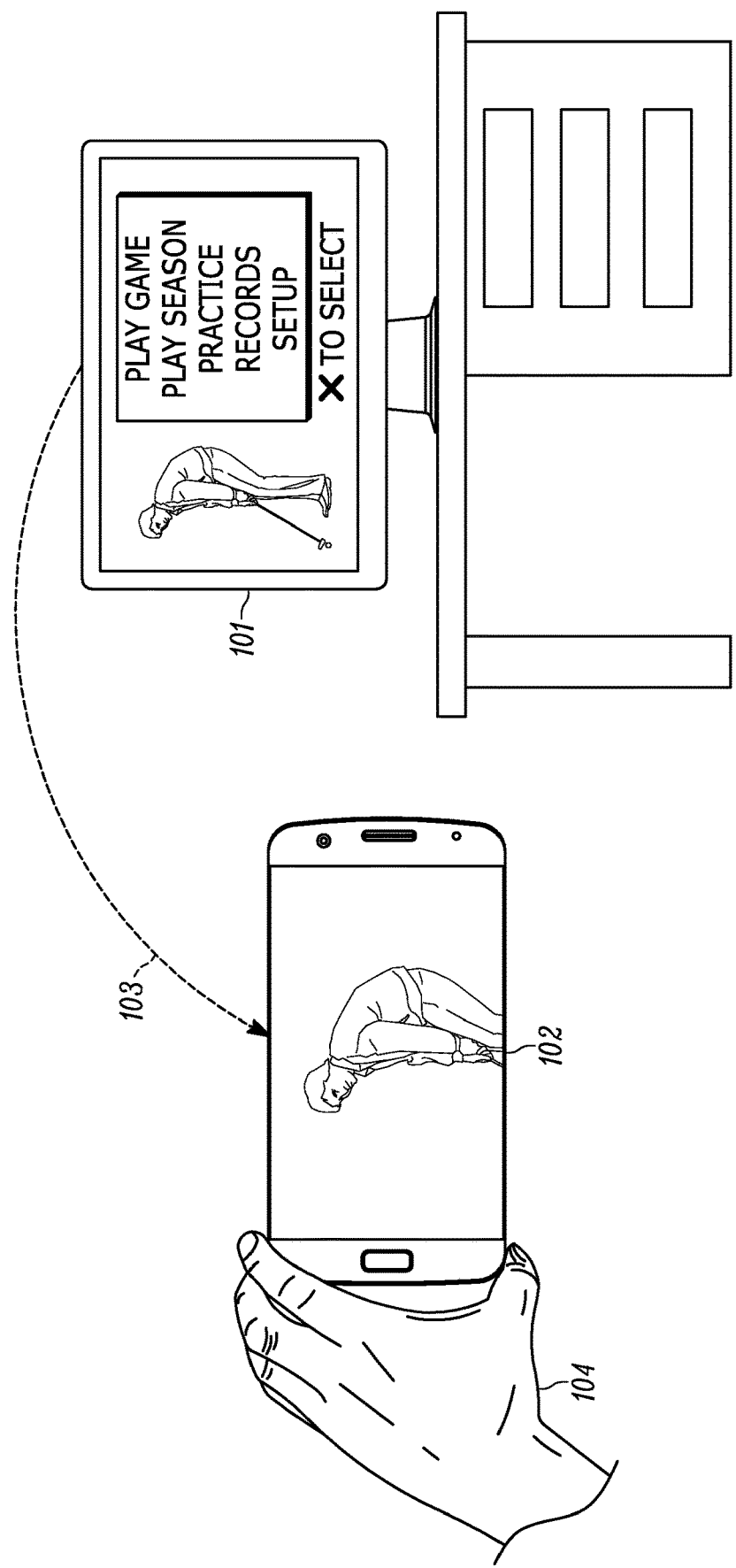
FIG. 1 is an illustration of tailored video streaming for a multi-device presentation.

FIG. 1 is an illustration of tailored video streaming for a multi-device presentation. A smart TV 101 displays an image and shares at least a portion of that image with a user device 102 over a communication channel 103, which may be Bluetooth, Wi-Fi, or a channel on some type of local area network (LAN). Smart TV 101 and user device 102 may communicate with any type of relevant video sharing protocols, including industry standardized protocols. Smart TV 101 is an example of a home media entertainment node. In general a home media entertainment node may be a smart TV, a set top box (STB) or a video hub. User device 102 is an additional display device, since it has a display screen for showing images and video. The displayed image may be a portion of a received primary video stream, based on the zoom and crop display settings of smart TV 101. By cropping a portion of a primary video stream, and displaying the cropped portion on a secondary (additional) video screen, a tailored content stream is generated from the primary video stream. This process gives the user the effect of a zoom view, even more so if the tailored content stream has a higher resolution than the primary video stream.

For example, Universal Plug and Play (UPnP), initially promoted by the UPnP Forum (currently managed by the Open Connectivity Foundation) is a set of networking protocols that permits networked devices, such as personal computers, printers, Internet gateways, Wi-Fi access points and mobile devices to seamlessly discover each other's presence on the network and establish functional network services for data sharing, communications, and entertainment. UPnP leverages HTTP, SOAP and XML to run on top of Internet Protocol (IP), to provide device/service description, actions, data transfer and event scheduling.

Additionally, Digital Living Network Alliance (DLNA) standard protocols may be used. DLNA provides a set of interoperability guidelines for sharing digital media among multimedia devices under a certification standard. DLNA standards provide link protection on each end of the data transfer, and digital rights management (DRM) security protections allows broadcast operators to enable consumers to share their content on multimedia devices while mitigating the risk of piracy. DLNA standards incorporate prior-existing standards, including UPnP, for media management and device discovery and control.

A user 104 holds user device 102 for close-up personal viewing. User device 102 may be a smart phone, tablet, phablet, a head mounted display device (HMD) such as 3D virtual reality (VR) goggles, or any suitable mobile or wireless device for viewing video. With the novel system of FIG. 1, a large smart TV provides a social interaction among multiple viewers while (mobile) devices, such as tablets and smart phones, provide personalized experiences. Connecting a shared large screen to a customized small screen provides opportunities for both group and individual interactions in the same setting.

Tailored Video Streaming

As a home media entertainment hub, a smart TV may be a control point in home entertainment. For some embodiments, if a content creator provides (suitable) context information about an audio-video stream, a smart TV is able to create new, detailed viewpoints to the content based on user preferences. User devices connected to a smart TV may create a multi-device experience if the smart TV streams additional content to users based on user preferences. An experience may be unique for each user because an experience is based on a smart TV's implementation and ability to use context information received from content creators and users. This experience may be created from additional content available to a smart TV and may be synchronized tightly to a TV experience. As such, a smart TV may have a central role in creating an audio-visual (AV) experience.

A new smart TV or media hub may receive a content multiplex that includes several different audio-visual streams, sensor data collected from the captured target, and contextual information about the covered event and additional content streams related to the event. Metadata received by a home entertainment video node, from a content provider, may include sensor and context data corresponding to an object to be traced (a captured target) within the primary video stream. A smart TV may be able to create different presentations in a multi-device environment by extracting content from the received streams. For example, the smart TV may extract and zoom regions of interest using accompanying sensor information about the target. In addition, content may be enriched with additional material such as visual overlays (which may be available in a stream composition). Thus, a region of interest may be extracted from the primary video stream by the smart TV, or may be indicated in metadata received within the primary video stream. However, the number of different possibilities to create and extract tailored presentations may be too high to manage, and the configuration of different presentations for user interfaces is becoming more complex. In addition, constructing meaningful presentations may, in some cases, require user feedback.

Systems and methods described herein may provide the ability to synchronize multiple personalized experiences with a common, shared-group experience. Systems and methods described herein synchronize additional content with the primary content provided by a TV or STB. For some embodiments, a TV or STB performs intermediate processing and outputs metadata that enables personalization by a second screen device. Feedback received by the TV or STB may be used to provide custom video from a TV or STB to a second screen device.

Tailored Video Presentation Management

A media hub receiver comprising a smart TV and a display may receive, from a video on demand or video streaming service, a content stream, content related metadata, and contextual information about a stream and sensor signals. A smart TV, STB or video hub may construct a plurality of simultaneous presentations from a content stream using accompanying metadata, sensor signals, and context information. A smart TV may stream a plurality of multi-view presentations to a multi-device environment comprising user devices, such as smart phones and tablets. Individual user devices may collect user and local context information for a smart TV. In addition, a smart TV may retrieve a user profile from a network server, which stores such user context.

A smart TV may use a recommendation engine to combine content information and user preferences to control multi-device presentation management. Hence, a constructed multi-device presentation selection may be relevant to users of connected personal devices. For one embodiment, personalized views may be produced from content received by a smart TV. A set of options are produced in a smart TV and transmitted to a user device, where a mobile user may select one for personal view. For such an embodiment, tight synchronization may be limited only by local processing and replication delays of a mobile display.

Some embodiments add information and different view angles to a video stream, and a smart TV may manage and process content for a multi-device ecosystem. Only replicating the content from a TV to another device may be used to provide a full frame stream to be displayed by another device, but second screen TV applications enable users to personalize and enhance their viewing experience.

With increases in TV resolution, a user may not need to see an entire video frame on a user device. Merely replicating the video from a TV on a second device may be inefficient if the resolution of the TV content exceeds that of the user device. Additionally, a large amount of bandwidth may be needed to send high resolution video to a user device. Even if bandwidth is not a problem, a user device may not have the processing ability to support the same resolution or compression formats as a TV. Also, processing unused information wastes valuable battery capacity and resources on the user device.

A smart TV set may receive an audio-visual stream from either a transmission broadcast or an Internet content stream. In either case, a smart TV set handles the content, displays the main content on a screen, and creates additional content using content analysis and contextual cues. For example, a main content stream may be 8k video with High Efficiency Video Coding (HEVC) compression. The smart TV distributes additional content to connected user devices in a multi-device environment. The TV receives descriptions of content sub-regions selections from a content recommendation engine (perhaps on a user device) and prepares this content. However, streaming a sub-region of 8k video may exceed bandwidth limits of the wireless link to a connected device as well as video rendering capabilities of a user device. Therefore, a smart TV may use an Advanced Video Coding (AVC) codec for encoding a sub-region, and a user device may use a hardware AVC video decoder to get data for display.

For example, a smart TV that is connected to a video on demand service may use an MPEG DASH (or similar)-based live streaming protocol to stream simultaneously multiple different audio-visual streams and metadata from a content server to a TV. Several streams may be received simultaneously. Streams may include additional metadata about the content and additional information, such as timed text or images. Also, metadata may contain contextual information about the location of a camera and objects/targets in a view. Broadcasters may provide a similar service with or without embedded metadata streams. Metadata for target locations enables tracing of targets in a presentation view. In addition, there may be additional information about content and targets. Contextual information and other metadata may contain links to additional information and content streams. A smart TV may manage several simultaneous streams which are selected by user preferences. For example, the location of each target in a view may be determined for a visual stream (based on the context information or location tracking). A content application on the smart TV may be able to trace a plurality of targets and extract additional streams by zooming in on a target.

Smart TV users with mobile user devices (such as tablets and smart phones) may be connected directly to a TV, e.g., using Bluetooth or Wi-Fi. Users may select content based on individual interests or preferences. A connected device may also control TV functionalities and content. For some embodiments, a smart TV receiver set manages content streaming received from a server and tailors the content for the TV itself based on user control. For many embodiments, a smart TV is the control point for presentation. A smart TV receives a broadcast or streams content from a service provider. Content may be managed by the TV and distributed among peripheral devices based on user preferences as well as content. The TV then controls the bit stream and broadcasts the data only to a broadcast or stream receiver and local user devices. With such an arrangement, users may receive a rich multi-device presentation with a main presentation on a large TV screen and additional views, zoomed content, and additional information on a personal smaller screen. That is, the tailored content may be forwarded to connected user devices to improve a user's experience with detailed information instead of just replication of a TV presentation.

If a TV manages content, synchronization is not a substantial problem because all the content passes through a single source. Users may follow the TV stream if using tablets and mobile phones. Users may not need to find additional information in web services. Hence, users are not distracted from the main content feed to track down personal information from other sources, such as Twitter or Facebook. Users may control additional content based on user preferences and selections. A user may want to follow a certain target on a view. This scenario may occur if a zoomed view is delivered to a tablet. The actual presentation on the TV is not disturbed by different selections. Different users may receive different personalized streams on their user device while viewing a common, shared experience on a primary display. Resources, such as user device battery power and bandwidth of various connections (such as between a TV and a user device), are used efficiently by using systems and methods described herein. Also, access to content is increased by a TV that may support a high resolution (such as 4K or 8K) while delivering a desired region of interest to a user device in a format supported by the device.

The audio-visual TV content may originate from a live event or a video on demand service. The broadcaster or ISP may manage the content and make the content available for TV viewers. The TV content is broadcast or streamed, e.g., using the MPEG DASH protocol, and may be able to carry multiple content streams and metadata. Contextual information about the actual audio visual content and the recording environment may be included as additional content or metadata. For example, the content may include location information about the camera setup and coordinates of identified targets in an audio-visual image. Also for example, an ice hockey player may wear a device providing continual indoor location tracking to a cloud service connected to a TV program. The stream may have instructions on how to select one or more region of interests within a view or provide addition information about the content. All this information may be included in the streamed protocol. Contextual information and additional content cues may be added so that a smart TV is able to reconstruct additional content streams for connected devices in a multi-device environment. A content owner and creator may account for a multi-device consumption environment in the content creation phase. Additional metadata cues may be included in the audio-visual stream to enable a smart TV receiver to extract additional content streams. In addition, a director of a presentation may concentrate on the overall event with the main content and a smart TV is able to tailor content for end users.

Figure 2:
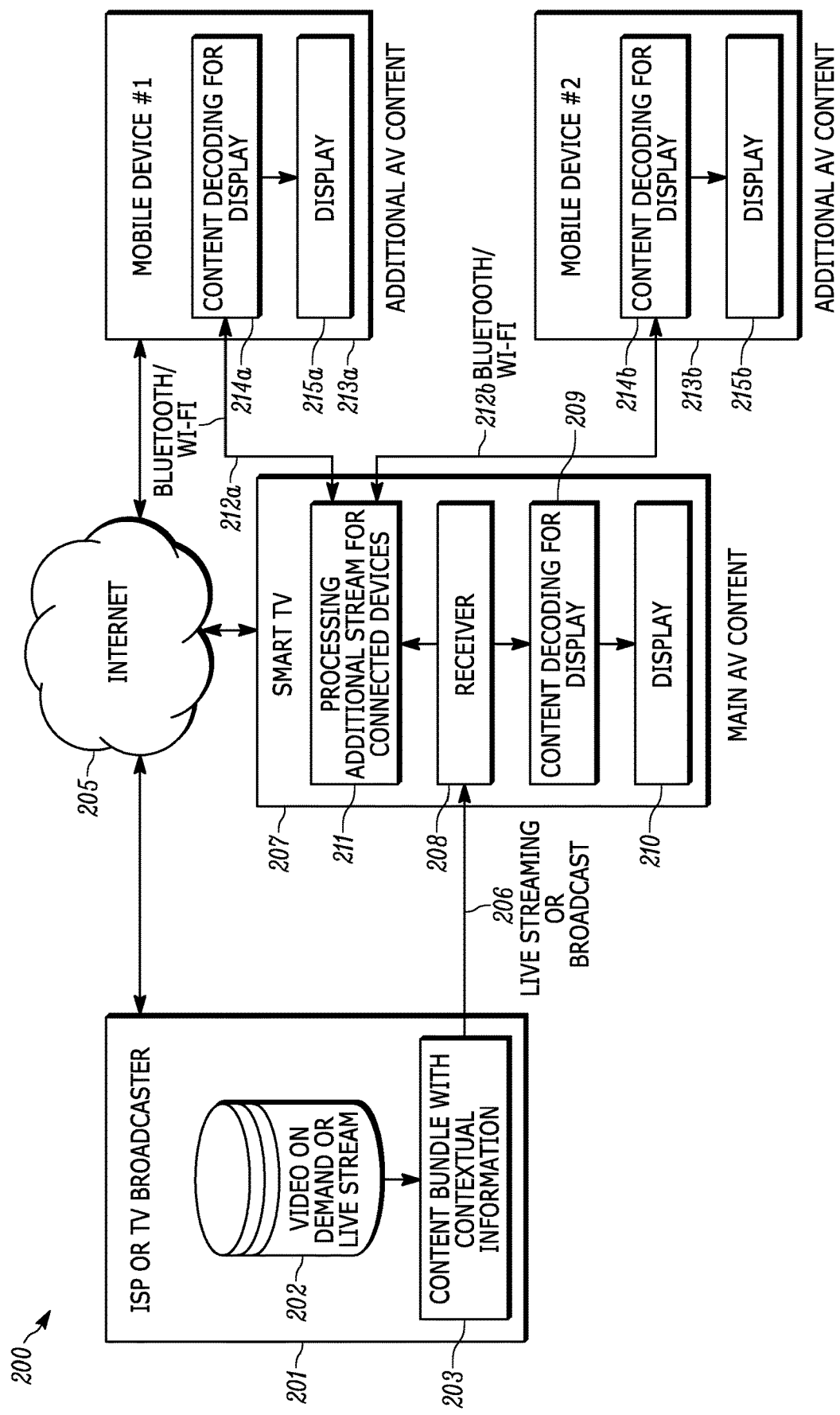
FIG. 2 is a block diagram of an exemplary system for tailoring video content for multiple user devices.

FIG. 2 is a block diagram of an exemplary system 200 for tailoring video content for multiple user devices. FIG. 2 shows the architecture for a smart TV system to receive rich content and create additional media presentations for one or more viewers in a multi-device environment. A content owner or video on demand service may prepare audio-visual content, illustrated as residing on a data storage element 202, and bundle it with metadata in box 203 for transmission. Video content can thus be provided to a smart TV or an STB from an ISP or broadcaster. The main video content may be shown on a shared large display to be watched by a group, while individual user devices may be connected to a smart TV and may receive customized video feeds synchronized with the main program. Such a scenario is illustrated in FIG. 2.

Transmission may be over the internet 205, generally, or more specifically, over an MPEG DASH streaming protocol or broadcast system 206. A smart TV set 207, which may be similar to smart TV 101 (of FIG. 1) comprises a receiver 208 to receive the content. Smart TV 207 unbundles the content and decodes it in box 209 to display at least a portion of the primary video stream (the main audio-visual content) on a main display 210. Smart TV 207 also creates additional content independently, in box 211, using the incoming stream and metadata for one or more new content streams. For example, smart TV 207 may extract continual location information of different targets on the visual content and the location of the camera. With this information, smart TV 207 may crop a target and a region of interest (or spatial portion) from the video stream and enlarge the image. The new cropped and zoomed video stream may be transmitted over communication channels 212a and 212b to connected user devices 213a and 213b.

Communication channels 212a and 212b may be Bluetooth, Wi-Fi, or some other type, similar to communication channel 103 (of FIG. 1). For example communication channel 212a may be Bluetooth, whereas communication channel 212b may be Wi-Fi Direct. User devices 213a and 213b may be smart phones or tablets, similar to user device 102 (of FIG. 1). A smart TV may communicate to different connected devices different streams with different viewpoints of the original content to different connected devices. Applications 214a and 214b, running on user devices 213a and 213b, respectively, decode the data steam from smart TV 207 to show the video on the user device displays 215a and 215 as additional content streams to the audio-visual presentation on smart TV 207.

The individual users may select an object to track or specify a desired region of interest to show on user devices 213a and 213b. User control messages and local contextual information from connected user devices 213a and 213b may be transmitted to smart TV 207 over channels 212a and 212b. The proximity of the viewers to user devices 213a and 213b may create an effective zoom effect. That is, displaying a cropped image on closer device creates a perceived zoom effect, even if the resolution is the same. However, the resolution of the cropped video portion may have a lower resolution or higher resolution, depending on the display capabilities of user devices 213a and 213b. As an alternative transmission path, user devices 213a and 213b may connect to the internet, along with smart TV 207.

Using systems and methods described herein, a connected application 214a enhanced by a direct connection 212a with a smart TV 207 provides the user device 213a with personalized video selections synchronized with the main AV content. A content owner and a broadcaster may account for an end user with a multi-device presentation capability. A content creator may add contextual cues and instructions that a smart TV receiver set may use for constructing additional presentations with connected devices. The metadata may include a stream of coordinates for an object that a user may prefer tracing or an area of a view that contains interesting details. Alternatively, metadata may contain a cue to an additional audio or video stream that may be sent to a device. Content creators may have a variety of tools for building a multi-device presentation. In addition, a smart TV may split, between a TV display and connected devices, information flow of textual content and graphics and a supporting video stream. Metadata attached to an audio-visual stream may contain coordinates of objects appearing in the video and information about camera position. The smart TV may be able to triangulate an object on the screen. And, if an object's location is determined, the smart TV may crop a predefined area, a region of interest, around the object to be distributed to connected devices.

Figure 3:
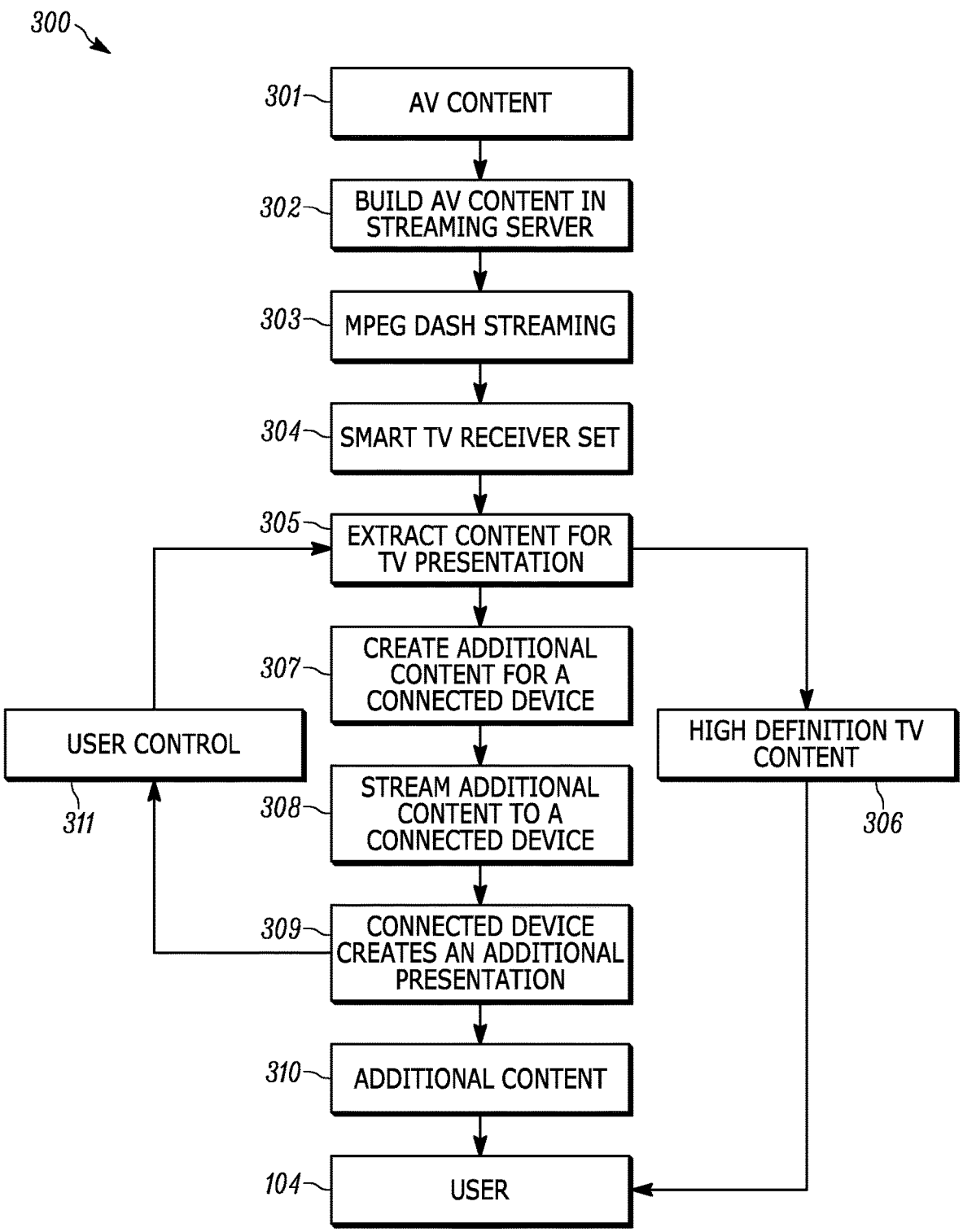
FIG. 3 is a flowchart of a method of tailoring video content for a user device.

FIG. 3 is a flowchart of a method 300 of tailoring video content for a user device, for example one of user devices 102, 213a, or 213b (of FIGS. 1 and 2). Using method 300, a smart TV may receive a stream from a content owner and create a multi-device experience. Starting in box 301, AV content is received by a streaming server and prepared in box 302 for streaming to a smart TV that may extract multi-device media content for presentation to a user. In box 303, a stream is transmitted to a smart TV receiver set, for example, using MPEG DASH or broadcast channels, and is received in box 304. A smart TV is able to tailor content for end users. Content for presentation is extracted from the received stream in box 305, and high definition TV content is sent to a large screen in box 306. Additional content for connected devices is created, such as by extracting a zoomed region of interest, in box 307, to form an additional multi-device presentation. The additional content may then be streamed to a connected device in box 308. The connected device then forms the additional presentation in box 309 and displays it in box 310. Based on user control, more content may be created by the connected device and communicated back to a smart TV receiver device in box 311. User 104 may view high definition TV content (or the main AV presentation for some embodiments) from a smart TV screen and receive additional content stream from a connected smart phone or tablet. A connected device user is able to select additional content using an application user interface. If the user connects a user device to a smart TV for selection of content, the smart TV displays additional content streams that are available. The user may make a selection from the application UI, and the smart TV may display the selection.

Figure 4:
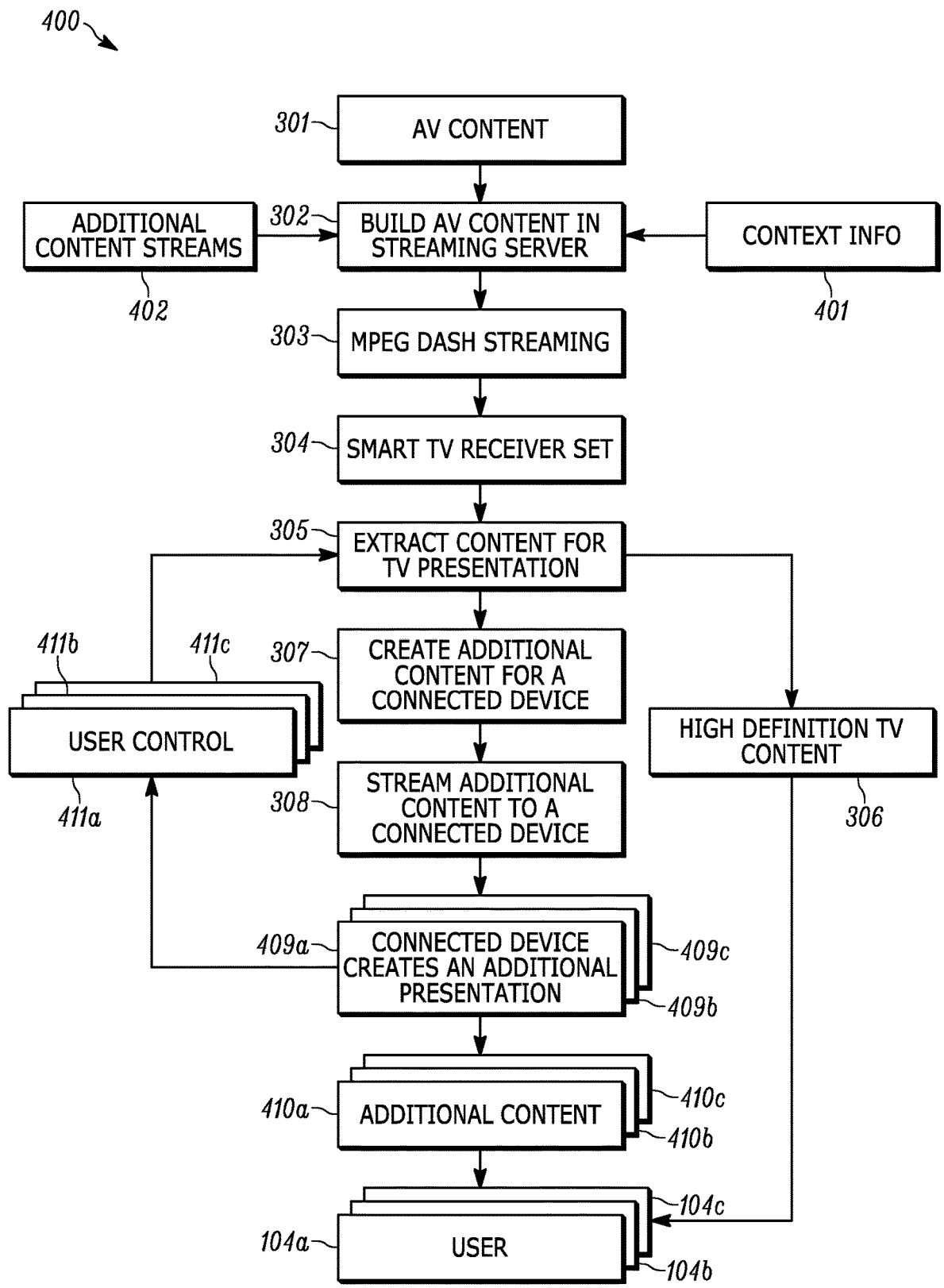
FIG. 4 is flowchart of a method of tailoring multiple video content streams.

FIG. 4 is flowchart of a method 400 of tailoring multiple video content streams for different connected devices. FIG. 4 shows a method for a smart TV to receive an enriched content stream and create a multi-device experience for several connected devices. Similarly with method 300, starting in box 301, AV content is received by a streaming server and prepared in box 302 for streaming to a smart TV that may extract multi-device media content for presentation to a user. That AV content may be enriched with contextual information 401 from a source with additional context information, for example, external sensor information. In addition, there may be additional added-value content streams 402. An ISP or broadcaster takes the AV content either from live stream or from a content server, such as video on demand. For some embodiments, all available contextual information may be bundled in a stream.

In box 303, a bundle is transmitted to a smart TV receiver set, for example, using MPEG DASH or broadcast channels, and is received in box 304. Streamed content may be backwards compatible. A regular (not smart) TV may receive AV content without decoding a metadata stream. A smart TV, however, is able to extract context information from the stream, unbundle additional content, and create a tailored, multi-device presentation for one or more connected devices. Content for presentation is extracted from the received stream in box 305, and high definition TV content is sent to a large screen in box 306. Additional content for connected devices is created, such as by extracting a zoomed region of interest, in box 307, to form an additional multi-device presentation. The additional content may then be streamed to connected devices in box 308.

The connected devices then form the additional presentation in boxes 409a, 409b, and 409c and each displays the additional content in boxes 410a, 410b, and 410c for users 104a, 104b, and 104c, respectively. The number of additional streams may depend on metadata, smart TV content extraction methods, and the number of connected devices. There may be as many different streams as there are smart phones or tablets connected to a TV with a wireless link. The users 104a-104c are each able to select additional or tailored content using an application UI. Alternatively, a connected device communicates user preferences and local contextual information to a smart TV. For example, language selection, user profile, contact information, installed applications, and location data may be used to determine content bias (i.e., user preferences), which may be used to select an additional content stream automatically. Based on user control, more content may be created by the connected device and communicated back to a smart TV receiver device in boxes 411a, 411b, and 411c.

Using method 400, multiple tailored video streams may be constructed. For example, a plurality of (two or more) content streams may be constructed from the primary video stream for multiple different regions of interest, such two tailored content streams show different video than each other and the displayed portion of the primary video stream. The two tailored content streams are transmitted to different display devices, neither of which is the first display and the second display device.

Figure 5:
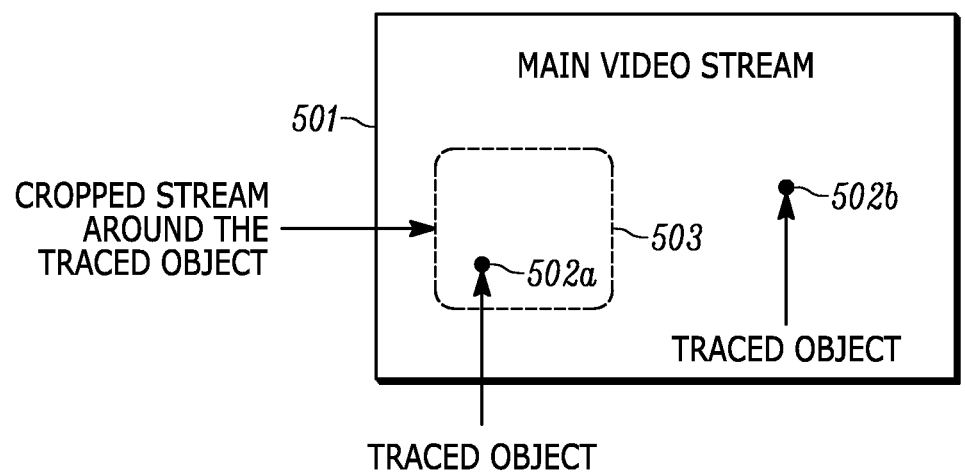
FIG. 5 is an illustration of cropping a video stream around a traced object.

FIG. 5 is an illustration of cropping a video stream around a traced object, for example, when a smart TV creates an additional video stream by cropping the frame around a traced object. As illustrated in FIG. 5, within a displayed portion of a primary video stream 501, two objects 502a and 502b are traced. A request to follow a traced object may be received from a display device, and a region of interest may then comprise a cropped portion of the primary video stream that includes the traced object. A cropping frame 503 (corresponding to a region of interest) is extracted from the primary video stream to create a new content stream that includes the cropped video, perhaps at a higher resolution. For some embodiments, a traced object is a favorite player on a sports team. As shown in FIG. 5 as solid black circles, there may be more than one traced object (502a and 502b) available for selection. In such a case, the local context of a smart TV and user context information received from a connected device may be applied to determine which traced object (502a or 502b) to use for additional content creation. If there is more than one connected device with different content biases, a smart TV may extract separate streams for each receiving unit.

An original video stream may have 8k resolution with HEVC encoding. Bandwidth, computation capability, and battery capacity of a user device may be exceeded if an entire image is replicated to the device at full resolution. If an entire image is sent at a reduced resolution, detail may be lost. Therefore, for some embodiments, a smart TV crops the region of interest and encodes the video stream, e.g., with an AVC video encoder. This method may enable a user device to use a hardware-implemented AVC video decoder for efficient content representation.

Figure 6:
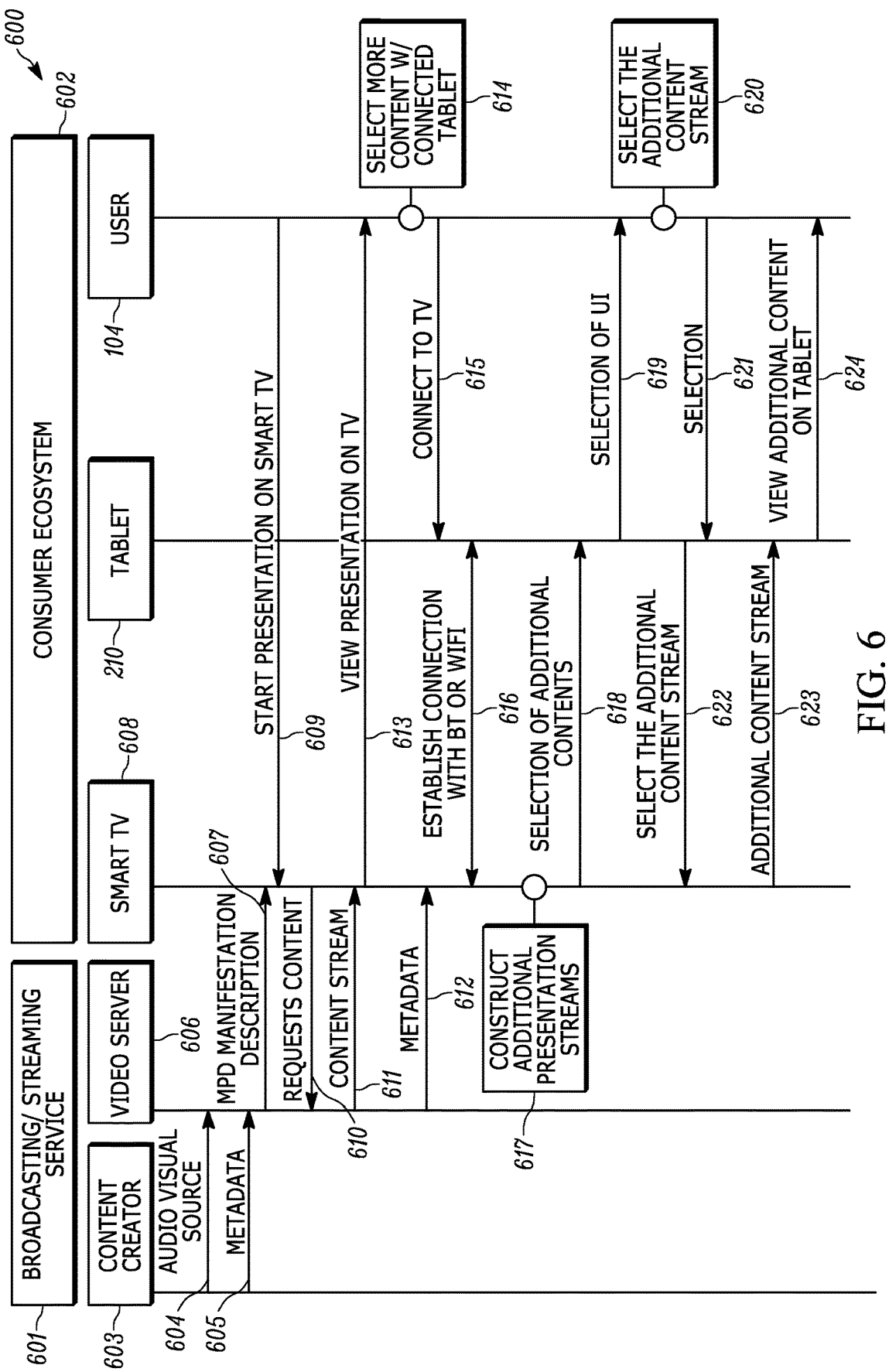
FIG. 6 is a message sequence diagram for a method of selecting video content for a user device.

FIG. 6 is a message sequence diagram 600 for a method of selecting video content for a user device, in a multi-device environment. A broadcast and streaming service 601 may have content originating from a live source or a stored location, such as a video on demand database to be sent to a consumer smart TV ecosystem 602. A content creator 603 may combine audio-visual content 604 with (relevant) contextual information as metadata 605 within a broadcasted or streamed content. These are sent to a video server 606.

A content manifest 607 in a media presentation description (MPD) format may be sent to a smart TV receiver 608, which may be similar to smart TV 101 or 207 (of FIGS. 1 and 2). Based on this information, user 104 may be able to select a TV content stream with a request 609 from a user device 210, which may be similar to user device 102 of FIG. 1. Smart TV 608 may send a request 610 for content and metadata streams to server 606 or may select a stream from a broadcast. The content stream 611 and metadata stream 612 are sent to smart TV 608, and the content is presented 613 to user 104. User 104 wishes to select 614 more content to view on device 210, so instructs 615 device 210 to connect to smart TV 608. Device 210 and smart TV 608 establish a connection 616, using Bluetooth, WiFi, or some other available connection, and smart TV 608 constructs additional presentation streams 617. Smart TV 608 then sends a signal to select additional content 618 to device 210, which presents it 619 to user 104 as part of a user interface (UI) program. User 104 selects a specific content 620 from the list of available content streams or targets appearing in the stream, and communicates selection 621 to device 210, which sends the selection 622 to smart TV 608. Selection 621 may be, for example, a request to follow a traced object. The content stream is sent 623 to device 210 which displays it 624 for viewing by user 104. In this way, when an audio-visual broadcast stream is displayed on a smart TV display, a users device may request more information and an additional view point to a presentation over a Bluetooth, Wi-Fi, or other connection.

For one embodiment, a smart TV may extract metadata from a content stream. The smart TV may apply local contextual information of the smart TV. The smart TV's language selection and the audio-visual signal the TV is receiving may be used for selecting and creating additional content streams. Applying contextual cues, content analysis, and instructions within metadata, a smart TV may create a presentation that is tailored for connected user devices. Options for video streams may be communicated to a connected device application. The user may make a selection on an application UI. For example, an application may make a coarse representation or description of each available stream. The user may select additional content, and the connected device may request a stream from the smart TV. The connected device displays the additional content stream, which is viewed by the user.

A method of sharing media may comprise receiving primary video stream 611 at a first node 608, the first node being, for example, smart TV. Primary video stream 611 comprises information regarding at least one region of interest (corresponding to cropped portion 503 of the displayed primary video stream 501 of FIG. 5). The method further includes displaying 613 a first portion of the primary video stream on a first display (perhaps the display screen of smart TV 608); constructing 617 a tailored content stream from the primary video stream for a first one of the at least one region of interest, the first tailored content stream different than the displayed portion of the primary video stream; transmitting 623 the first tailored content stream to a second display device 210 different than the first display. Tailored content streams may have a different resolution than the displayed primary video stream, and may be transmitted to be synchronized with the primary video stream. Transmission may occur over a wireless LAN in a UPnP DLNA protocol, and tailored content streams may also have DRM security protections.

Figure 7:
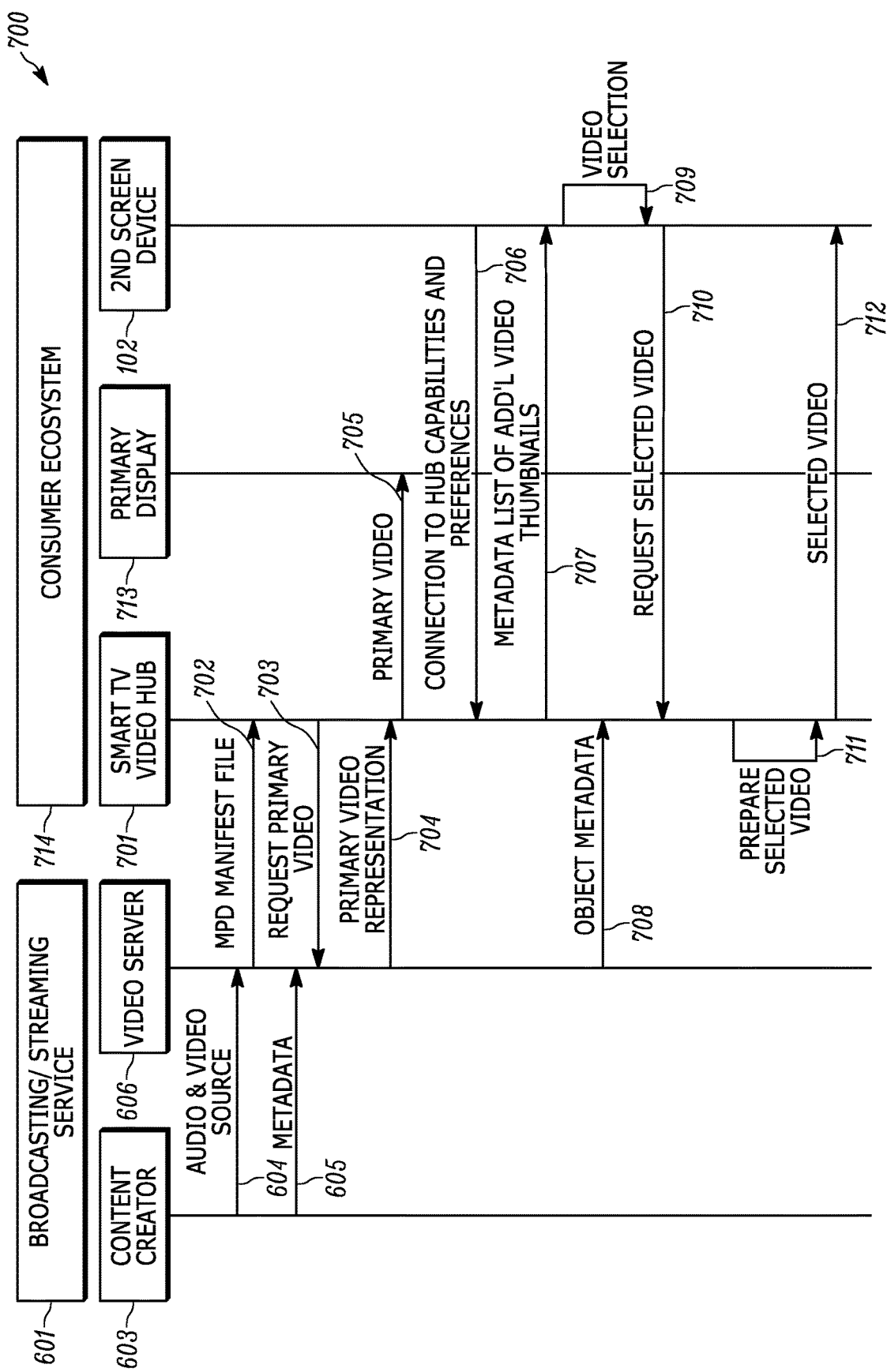
FIG. 7 is a message sequence diagram for a method of selecting video content for two display devices.

FIG. 7 is a message sequence diagram 700 for a method of selecting video content for two display devices. Similarly to FIG. 6, an audio-visual source stream and metadata are received by a video server from a content creator for display on multiple devices, with different devices displaying different portions (full, zoomed to a first region, zoomed to a second region, . . . ). However, FIG. 7 illustrates a separation between a smart TV video hub 701 and a primary display 713. Primary display 713 may be the display for smart TV 101 or 608. Smart TV video hub 701 may be a full smart TV system, such as smart TV 608, and include a screen, or it may be a hub without a screen. Similarly, primary display 713 may also be a full smart TV system, such as smart TV 608, that is merely acting as a slave display, or it may be a mere display device without smart TV capability.

According to message sequence diagram 700, a broadcast and streaming service 601 may have content originating from a live source or a stored location, such as a video on demand database to be sent to a consumer smart TV ecosystem 714. A content creator 603 may combine audio-visual content 604 with (relevant) contextual information as metadata 605 within a broadcasted or streamed content. These are sent to a video server 606.

An MPD manifest file 702 in a media presentation description (MPD) format may be sent to a smart TV video hub 701, which then returns a request 703 for primary video. The primary video stream 704 is to smart TV video hub 701, which sends the primary video 705 to primary display 713. A second screen device 102 establishes a connection to send capabilities and preferences data 706 to smart TV video hub 701, which returns a metadata list 707 of additional video thumbnails available for selection. Additionally, video server 606, sends object metadata 708 to smart TV video hub 701. A selection 709 of tailored content possibilities is made on device 102 and communicated 710 to smart TV video hub 701, which prepares 711 and then sends the selected video 712 to device 102 for display.

Figure 8:
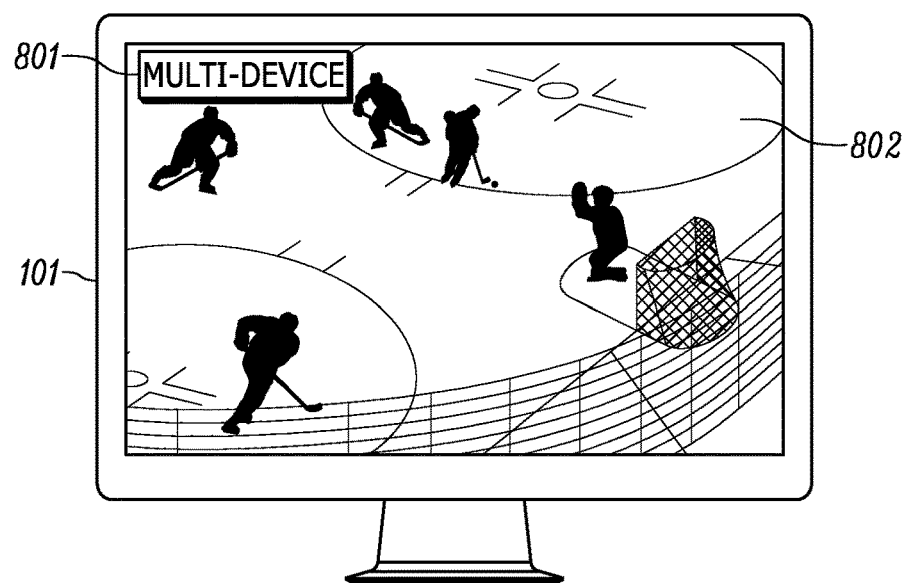
FIG. 8 is a front view of video content displayed on a TV, with an indication of a multi-device capability.

FIG. 8 is a front view of video content 802 displayed on a display 210 of a smart TV (see FIG. 2), with an indication 801 of a multi-device capability. Video content 802 is the displayed portion of the received primary video stream, and is determined, in part, by cropping and zoom settings of the host display. A smart TV display may have an icon appearing on the display to indicate that the smart TV is able to provide additional media content to connected user devices (which may be performed using a Bluetooth or Wi-Fi connection). Indication 801 is illustrated as text, although it could instead be a graphical icon. It should be noted, that even a mere TV display, that is not a smart TV, could display indication 801 if it were receiving a video feed from a smart TV video hub, such as smart TV video hub 701 of FIG. 7. In some embodiments, a smart TV may use an onboard microphone, camera, or devices such as a Microsoft Kinect to measure data for a viewing environment. Based on user behavior, a smart TV may set preferences (or biases) for additional content. A smart TV may select an additional stream or crop a region of interest around an object on the screen based on user reactions and smart TV settings.

For some embodiments of methods and systems described herein, a TV broadcast of a sporting event may be distributed in a multi-device environment. For example, a broadcaster may provide a high definition 8k resolution with an HEVC encoded stream. A smart TV receiver set may receive a stream together with metadata describing additional contextual details about a presentation. The video stream may be rendered on a display as a "normal" TV program, as shown in FIG. 8. For this example, the stream may also contain location information of each player on the ice. The smart TV display may have an icon appearing on the display that indicates that the TV is able to provide additional content to connected user devices, which may connect using Bluetooth or Wi-Fi.

A user may connect a tablet or smart phone to a smart TV using a dedicated mobile application, e.g., an application provided by the smart TV manufacturer. A user device communicates with a smart TV and receives information about available presentations corresponding to the current presentation being displayed on the smart TV. A mobile application's UI may display options for selection by a user. For example, a UI may enable a user to select one or more favorite sports teams. For some embodiments, such a selection may be based on the teams (or players) playing in the currently displayed game. A selection may be sent to a smart TV set for creation of a content stream. Alternatively, a mobile application may determine local context from device settings and user preferences and send a determined bias to a smart TV.

A smart TV may have streaming information about content, e.g., location information of targets on the screen and user preferences. For one embodiment, a Smart TV extracts one or more (candidate) regions of interest from the main video stream based on user interest and context. The smart TV may use location information to crop appropriate regions of interest. In addition, contextual information can be applied for content selection. For example, a user may be based in a particular city or may indicate a preference for that city's sports team. The smart TV may automatically crop the frame to a region of interest around a leading player who is on that particular sports team, and alternatively, a user may select to follow a zoomed region that follows a different specified player.

A smart TV may switch between players based on video content, e.g., the speed of a player or the happenings on the ice (or field or court). A director for an original source may set a preference order for target players. A smart TV may encode the region of interest stream, e.g., with an AVC encoder, and transmit the stream to a user device.

Figure 9:
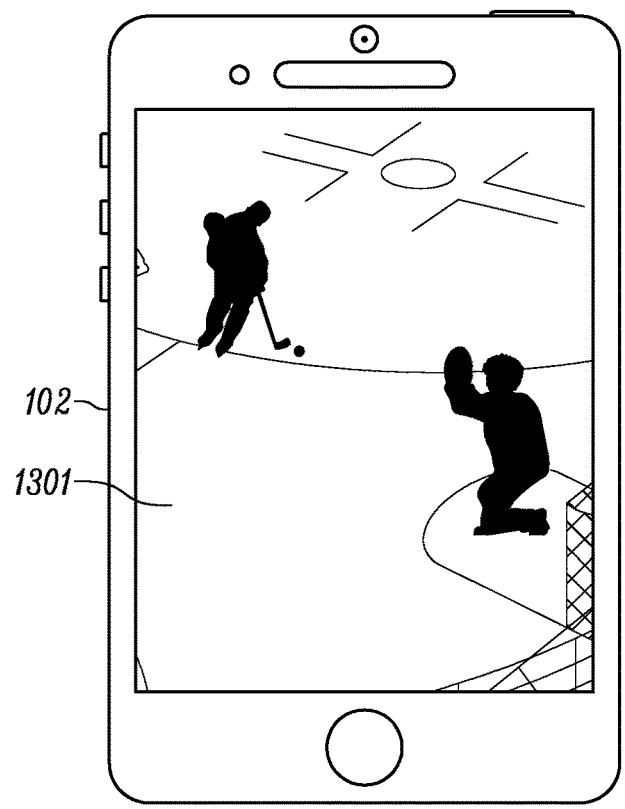
FIG. 9 is a front view of a user device displaying tailored video content.

FIG. 9 is a front view of user device 102 displaying tailored video content 1301, which will be explained in greater detail in the descriptions of FIGS. 13 and 14. In general, a region of interest may be selected by a smart TV and displayed on a connected device. User device 102 may receive a stream and render the content on the screen as shown in FIG. 9. A zoomed view of a traced target may be synchronized and streamed to a connected tablet or device. As a result, a user may be able to follow a game in detail with a user device, while a TV presentation may show the overall tactics of both teams. For some embodiments, the user may be able to switch preferences during presentation of a game. For example, an event or play may be replayed from different viewpoints. For one embodiment, within a mobile application, a viewer selects a player to trace from a main video stream.

Figure 10:
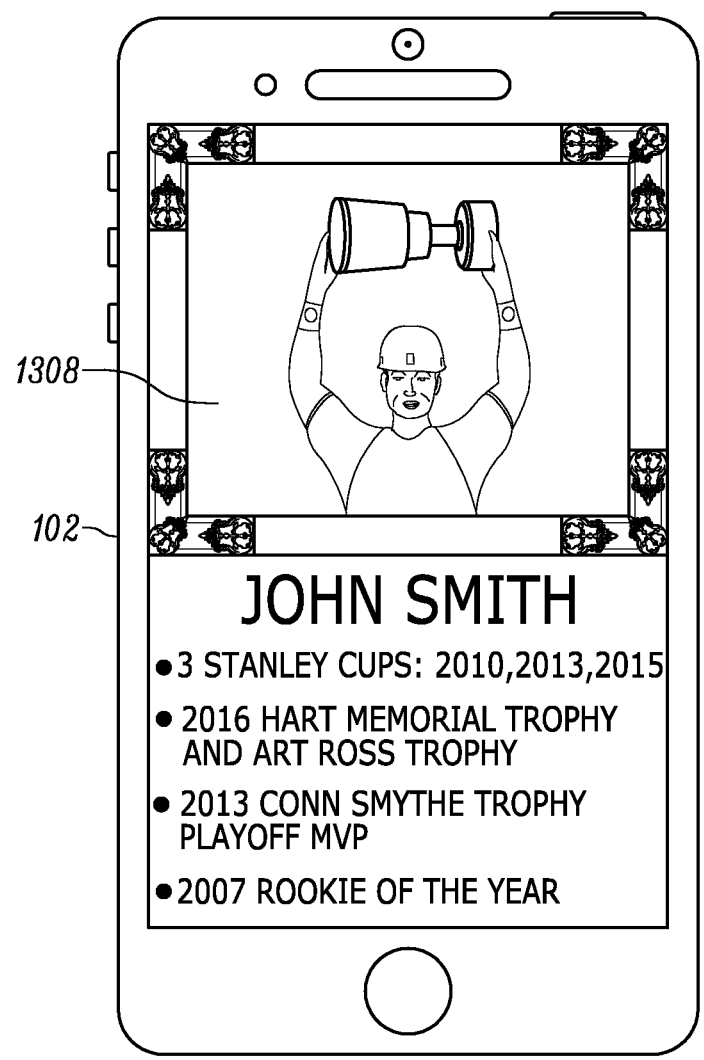
FIG. 10 is a front view of a user device displaying a player card with statistics.

FIG. 10 is a front view of user device 102 displaying a player card video stream 1308 with player statistics that may be of interest to a viewer. For some embodiments, a user selects a player within a user device application and additional information (such as player's card or statistics) is displayed by the user device application, rather than zoomed live video. FIG. 10 shows one such embodiment. For this example, a picture of the player may be displayed along with his or her name and career highlights or other statistics. A players card may be displayed if a player is selected to be followed but the player is not on the ice (or field or court) or in an available content stream. A tailored content stream may comprise an external content stream reference, such as a URL indicating a website, that is embedded within the primary video stream. Also, a smart TV may provide additional information such as game statistics for other content the recommendation engine is suggesting as the closest match to the user context and UI selection.

Tailored Video Presentation Management

Systems and methods described herein provide a method of content management for a smart TV that interacts with peripheral user devices connected to the smart TV. For many embodiments, a smart TV or smart TV video hub is the control point of the content presentation. Content may be managed by the TV and distributed among peripheral devices based on user preference as well as content. User preferences and context may be mapped automatically, which enables a system to create appropriate content streams and helps the user to select relevant content. The content may be forwarded to connected user devices to improve a user's experience with detailed information instead of just replication of a TV presentation. With such systems, users may receive a rich multi-device presentation with a main presentation on a TV and additional views, zoomed content, and additional information.

One embodiment of a method tailors selection of available content streams for a plurality of connected devices based on user context and audience preferences. Content producers may add extra streams to the content, such that content composition includes audio-visual content and metadata that are streamed to a smart TV and media hub receivers, possibly using the MPEG DASH protocol. The applied protocol may carry multiple content streams and metadata together with sensor signals. Contextual information about audio-visual content and recording environment may be included as additional content or metadata.

User devices may collect user context and information so that a smart TV is able to determine user preferences for content and have an application that communicates local context, sensor signals, device capabilities, and user information to a smart TV. A smart TV may then determine a users context and create user profiles based on received information. These user profiles may be used for content extraction and selection. An automatic recommendation engine may control smart TV content construction and extraction tools so that displayed content streams match an audience's preferences. A smart TV receives content and transmits different viewpoints of the content to a users device. A smart TV may also tailor content for connected devices based on the content and user context. Smart TV systems may limit the number of options to prevent consumers from being overwhelmed and to enable consumers to receive meaningful video stream presentations. A smart TV or media hub receives a content appropriate for display to a group, such as video with a wide field of view and a high resolution (4K or 8K), while individuals desire custom personalized views.

A smart TV may thus manage extracted multi-device content using context data, using a recommendation engine that applies user preferences for extracting from received audio visual content viewpoints relevant to an end user. Content selections may be transmitted to connected mobile phones, which may populate a UI grid with content, indicating selected content streams that are available for a user. The user may be able to select, with a user interface, available content extracted from a stream. A user may decide whether to view content on a user device or a smart TV, or some combination. A smart TV may extract the selected content with the appropriate format and resolution and forward the content stream to the correct devices. The selected information may be transmitted to a smart TV to extract the selected content with appropriate resolution and format and forward the content stream to the indicated device or devices.

A user may have freedom to select how a presentation is distributed in a multi-device environment. A smart TV display may be used for main content, while user devices may be used to view extracted, tailored content or vice versa. A user preference may be determined automatically using local context data and user information. This data may be applied by a recommendation engine that controls (or drives) smart TV content extraction. In this manner, a recommendation engine may recommend, or autonomously select, a region of interest based on the information related to local context and user preferences received from a display device. The number of different options to create multi-device presentation may be limited automatically making the user interface and content selection tractable.

Users may control additional content based on user preferences and selections. A user may want to follow a certain target on a view. This scenario may occur if a zoomed view is delivered to a tablet. The actual presentation on the TV is not disturbed by different selections. Different uses may receive different personalized streams on their user device while viewing a common, shared experience on a primary display. Direct Wi-Fi or Bluetooth connections between the smart TV and a user device enable synchronization and low latency for interactions.

For example, content may include location information about the camera setup and information about the identified targets on audio visual image. For another example, an ice hockey player may wear a device providing continual indoor location tracking to a cloud service which may be connected to a TV program production. A content stream bundle may have instructions on how to select one or more region of interests within a view and how to access addition information about content. This information may be included in a streamed protocol. Contextual information and additional content cues may be added such that a smart TV may be able to reconstruct and extract additional content streams for connected devices in multi-device environment.

Figure 11:
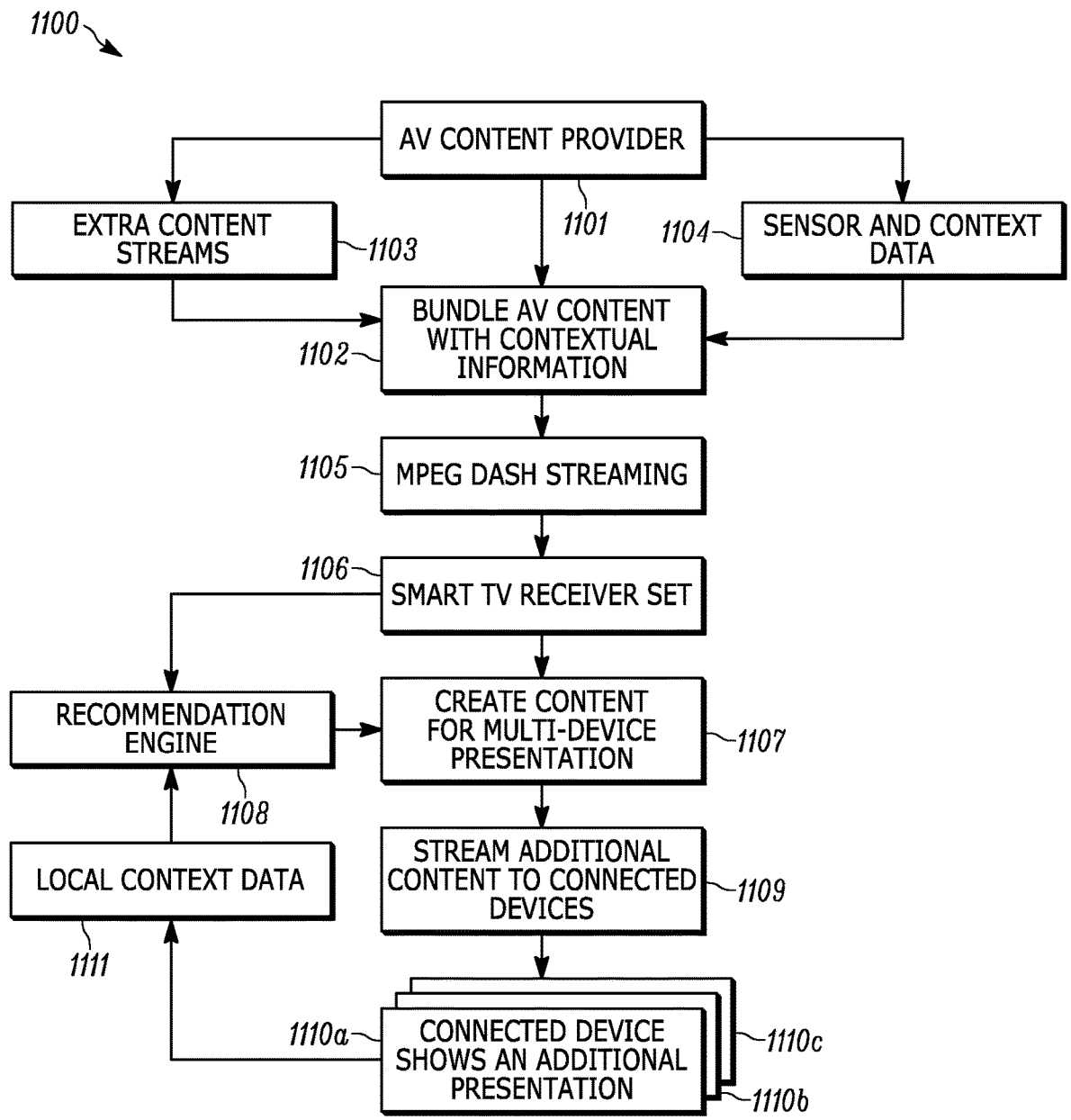
FIG. 11 is a flowchart of a method of creating content for a multi-device presentation.

FIG. 11 is a flowchart of a method 1100 of creating content for a multi-device presentation. Using method 1100, a smart TV or smart TV video hub may receive a stream from a content owner and create a multi-device experience. Starting in box 1101, AV content is received by a streaming server and bundled in box 1102 with extra content streams generated in box 1103 (perhaps similar to added-value content streams 402 of FIG. 4) and sensor and context data provided in box 1104. The extra content streams may be added by a video content producer, as described above, and sensor and context data may be collected, also as described above (i.e., from a target on captured video). Extra content streams may comprise, for example, sports player statistics, an actor's biographical information, additional camera angles, and other items that may be of interest to viewers. Additional metadata cues may be included in an audio-visual stream to enable a smart TV receiver set to extract additional content streams and tailor content for end users. A source may enrich AV content with contextual information, such as external sensor information. In addition, there may be additional content streams with added-value content.

The bundled AV content is then streamed in box 1105 and received by a smart TV receiver set (for example, a smart TV set or a smart TV video hub) in box 1106. Content for presentation is extracted from the received stream in box 1107 to form an additional multi-device presentation, such as by extracting a zoomed region of interest, providing subtitles or audio in an alternate language, or showing a different camera angle. A streamed content bundle received by a smart TV may be backwards compatible. A conventional broadcast TV receiver may be able to handle AV content without a metadata stream. A smart TV, however, may be able to extract context information from a stream, unbundle any additional content, and apply it to construct a tailored multi-device presentation for one or more connected devices. The number of additional streams may depend on metadata, smart TV content extraction methods, and the number of connected devices.

Additionally, the video stream data is sent to a recommendation engine in box 1108. A recommendation engine may process context information (both received from the AV content provider, and also the user, as explained in relation to box 1111, later). User context information can be used to determine user preferences for audio-visual content. For example, language selection, user profiles, contact information, installed applications, and location data may be used to determine a users preferences. A recommendation engine may use only certain camera view angles (which are sent by the AV content creator) and may control a presentation creation engine in box 1107, accordingly. A recommendation engine may apply user information such as: contact information and activity to interact with contacts, e.g., to determine similarities or connections with content; mobile application usage, e.g., to determine interests and hobbies; and sensor information to determine local context. A recommendation engine may limit the number of available options for extracting additional media streams from a streamed bundle, based upon the user information indicating preferences for viewing from certain camera angles or certain traced objects (such as players from certain sports teams). In addition, a recommendation engine may determine content features and context, and metadata may be used to determine a content type. For one embodiment, content may be analyzed continually to match optional regions of interest or to combine additional content with user preferences (or bias). For one embodiment, a recommendation engine creates a user profile for current and future tailoring of and recommendations of video stream option sets and determines a most likely viewpoint for features found in a stream.

The additional content may then be streamed to connected devices in box 1109. The connected devices then display the additional presentations in boxes 1110a, 1110b, and 1110c for their respective users. Connected user devices may run an application to connect to a smart TV and collect contextual information, sensor data, and user details that are available in the device or user profiles. This information may be communicated to a smart TV context recommendation engine in box 1111. In this manner, a smart TV system may receive an enriched content stream and create a multi-device experience for several connected devices with a content recommendation engine using contextual information from both a user device and a content stream.

Referring to FIG. 11, if a connection is established between a user device and a smart TV, a mobile application on the user device may collect user information, local user context and sensor data to operate a recommendation engine to enable a smart TV to process and limit the number of additional streams. User control signals and local contextual information from a connected user device may be transmitted to a smart TV over the same transmission channel.

A content owner and broadcaster may take into account an option for an end user to have a multi-device presentation capability. Hence, a content creator may add contextual cues, sensor data, and instructions that a smart TV receiver set may use to construct additional presentations for connected devices. Metadata may include a stream of coordinates for an object that a user may prefer tracing, or an area on a view that contains details that may be interesting to a user. Alternatively, metadata may contain a cue or link to an additional audio or video stream that may be forwarded for an additional device. Content creators may have a variety of tools and guidelines for building multi-device presentations. In addition, a smart TV may split information flow of textual content and graphics and supporting video streams between a TV display and connected devices.

Context data and user information from user devices may be collected by a recommendation engine (shown on FIG. 11). Using this information, a recommendation engine may determine user preferences for content. For example, user interest in content and past behavior may determine what type of content is extracted for a multi-device presentation. A presentation creation determines a set of stream options for a multi-device environment and creates preview streams for a mobile application user interface. A mobile application displays a UI grid of stream options. A user may select additional content using the application UI. If a selection is made, a smart TV may create corresponding streams for a multi-device environment. There may be as many different streams as there are smart phones or tablets connected to a TV (which may be wireless links). A user may view a main AV presentation from a smart TV screen and view an additional content stream from a connected smart phone or tablet.

Figure 12:
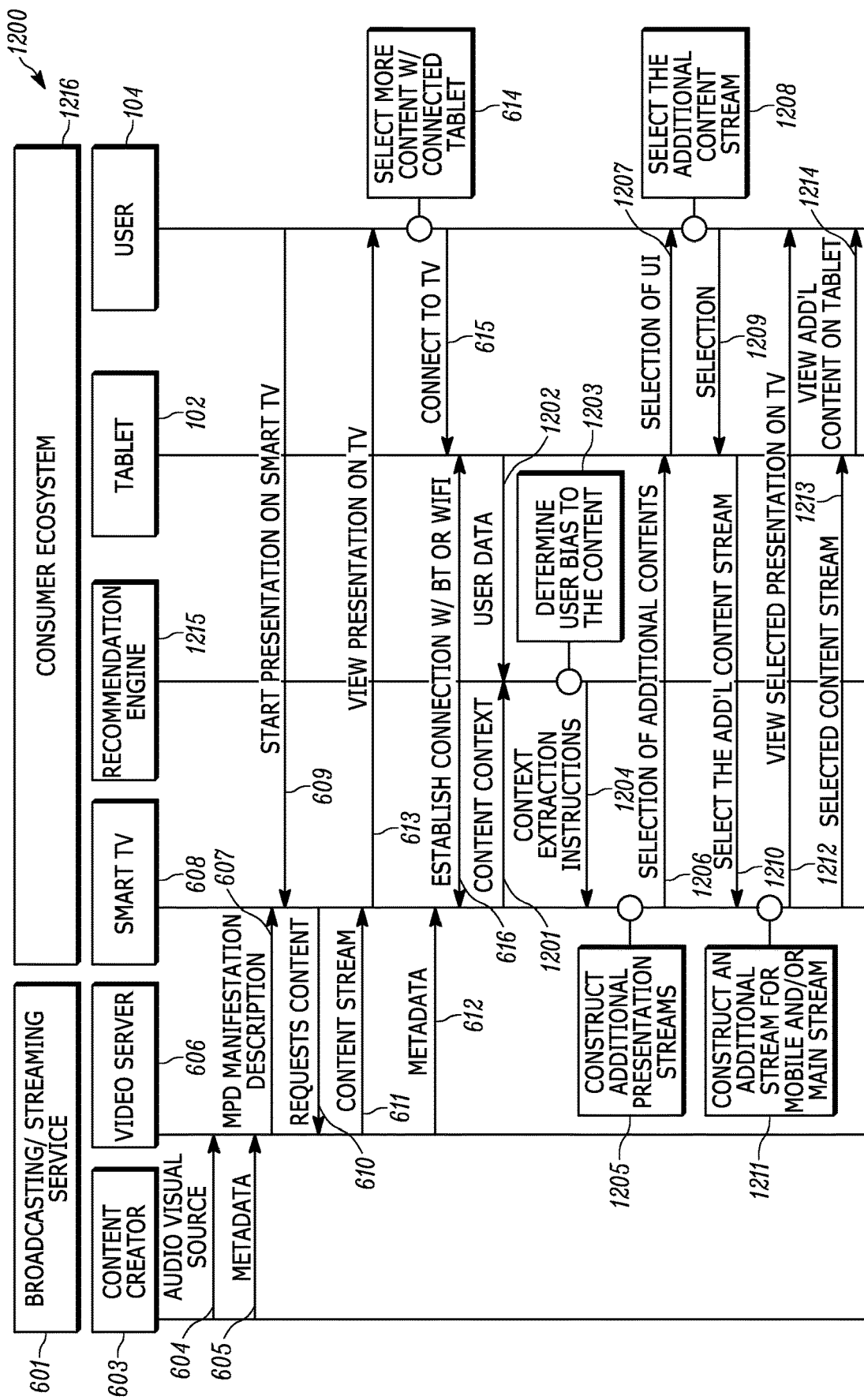
FIG. 12 is a message sequence diagram for tailoring video content for a user device.

FIG. 12 is a message sequence diagram 1200 for tailoring video content for a user device 102, which may be a tablet or a smart phone, or some other personal viewing device. Message sequence diagram 1200 uses a recommendation engine 1205, which may perform the process described above for box 1108 in FIG. 11. Similarly to FIGS. 6 and 7, an audio-visual source stream and metadata are received by a video server from a content creator for display on multiple devices. A broadcast and streaming service 601 may have content originating from a live source or a stored location, such as a video on demand database to be sent to a consumer smart TV ecosystem 1216. A content creator 603 may combine audio-visual content 604 with (relevant) contextual information as metadata 605 within a broadcasted or streamed content. These are sent to a video server 606. A content manifest 607 in a media presentation description (MPD) format may be sent to a smart TV receiver 608. Based on this information, user 104 may be able to select a TV content stream with a request 609. Smart TV 608 may send a request 610 for content and metadata streams to server 606 or may select a stream from a broadcast. The content stream 611 and metadata stream 612 are sent to smart TV 608, and the content is presented 613 to user 104. The AV stream may be displayed (or presented) immediately on the display of smart TV 608. User 104 wishes to select 614 more content to view on device 102, for example, more information and an additional view point to a presentation, and so instructs 615 device 102 to connect to smart TV 608. Device 102 and smart TV 608 establish a connection 616, using Bluetooth, WiFi, or some other available connection.

Smart TV 608 sends content context 1201 to recommendation engine 1215. Recommendation engine 1215 may be located within smart TV 608 and may extract metadata from a content stream and context information 1201 provided by smart TV 608 and user information 1202 provided by user device 102. In addition, smart TV 608 may use its own local contextual information, such as time, time zone, language selection, and location information such as city. A smart TV's language selection or an audio-visual signal received by the smart TV may be used for selecting and creating additional content streams, such as providing alternative language audio tracks. Applying contextual cues (process 1203), content analysis, instructions within metadata, and user preferences, recommendation engine 1215 controls creation of a presentation stream tailored for user preferences or biases in a multi-device environment.

Recommendation engine 1215 sends context extraction instructions 1204 to smart TV 608, which then constructs additional presentation streams 1205. Smart TV 608 then sends a signal to select additional content 1206 to device 102, which presents it 1207 to user 104 as part of a UI program. User 104 selects a specific content 1208, and communicates selection 1209 to device 102, which sends the selection 1210 to smart TV 608. For example, the application may render a coarse representation or display a description of each available stream. A user may select additional content and a connected device may request a stream from a smart TV for display (or representation). The selected presentation (the main presentation) is displayed 1212 on smart TV 608 for viewing by user 104, and the additional content stream is constructed 1211 and sent 1213 to device 102 which displays it 1214 for additional viewing by user 104. In this way, user 104 can simultaneously view a main presentation on the screen of smart TV 608 and a tailored additional stream on device 102.

Systems and methods described herein may be used to distribute a live broadcast of a sporting event in a multi-device environment. A broadcaster (or content provider) may provide a high definition 8k resolution stream encoded with HEVC. A smart TV receiver set may capture a stream together with metadata describing additional contextual details about a presentation. In addition to the audio-visual content, the stream may contain metadata and sensor information about the captured targets. For example, each player may have an indoor location tracking device collecting data for a media capture. Tracking data may be sent in a TV broadcast stream together with camera location and orientation. The user or the application may select to trace a specific target/object on the viewing screen. A user may connect a tablet or a smart phone to a smart TV using a dedicated mobile application, which may be provided by a smart TV manufacturer. And, as an example of a recommendation engine using location information, user context data may indicate that the user is a Chicago Blackhawks fan, so Chicago players may be recommended for extraction from the main content for zoomed in regions of interest. If a mobile user has followed player statistics, read news about games, or followed game statistics, the recommendation engine may add extra content on game statistics and player cards if there are no players or activity on the ice (or court or field).

Figure 13:
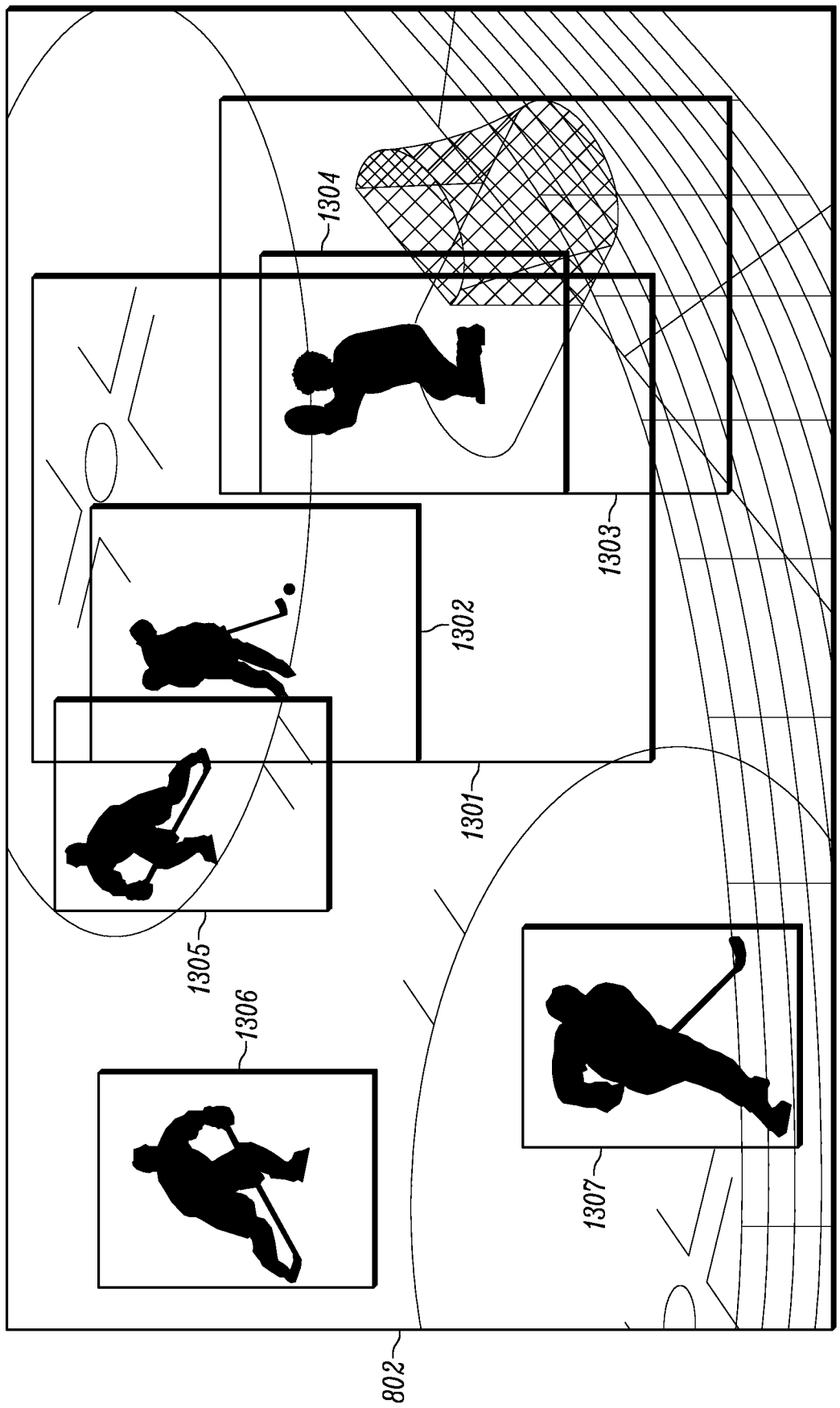
FIG. 13 is an example user interface screen shot that shows multiple options for cropping a main TV video frame.

FIG. 13 is an example user interface screen shot that shows multiple options for cropping a main TV video frame. FIG. 13 shows a main TV video stream displaying image 802 of FIG. 8, with a series of suggested crop boxes, each showing zoom regions for possible tailored video content. The illustrated possibilities for tailored video content streams are 1301 (which was previously shown in FIG. 9), and 1302-1307. A content extraction tool may extract regions of interest from the main stream and create a preview composition for a mobile application user interface. In some embodiments, a region of interest may be selected by a smart TV frame displayed on a connected device. For another, a smart TV creates a preview of available streams and combines video streams into a single stream that is used by a mobile application to display available stream options. Optionally, contextual information such as sensor information (location, motion, or temperature) may be included in a stream which may be used by a mobile application to populate a UI with information. For some embodiments, regions of interest are selected by a recommendation engine using user preference (or bias) data and, optionally, a user is able to switch preferences during a presentation. For example, a play or event may be replayed from different camera angle.

Individual extracted streams may be combined into a single composition that is transmitted to connected user devices. The encoding of a preview composition may use a relatively low bit rate with a coarse update rate. The mobile application may provide a user with an estimate (or thumbnail) of a selection's appearance if displayed. A preview composition may contain metadata about an available stream. For some embodiments, higher quality video streams may be video streams encoded with a higher resolution. Also, higher quality video streams may be video streams encoded at a higher bit rate or having a lower quantization parameter (QP). For some embodiments, a preview composition may be encoded with a lower bit rate or lower resolution or have a higher quantization parameter, while the video stream may sent at a higher quality corresponding to a higher bit rate, higher resolution, or lower quantization parameter if a user selects that video stream to be displayed. Regions of interest may be extracted from the main view and captured regions may be streamed to connected devices. A mobile application may populate a UI with an encapsulated stream and corresponding metadata. Additional streams may be included in a composition.

Figure 14:
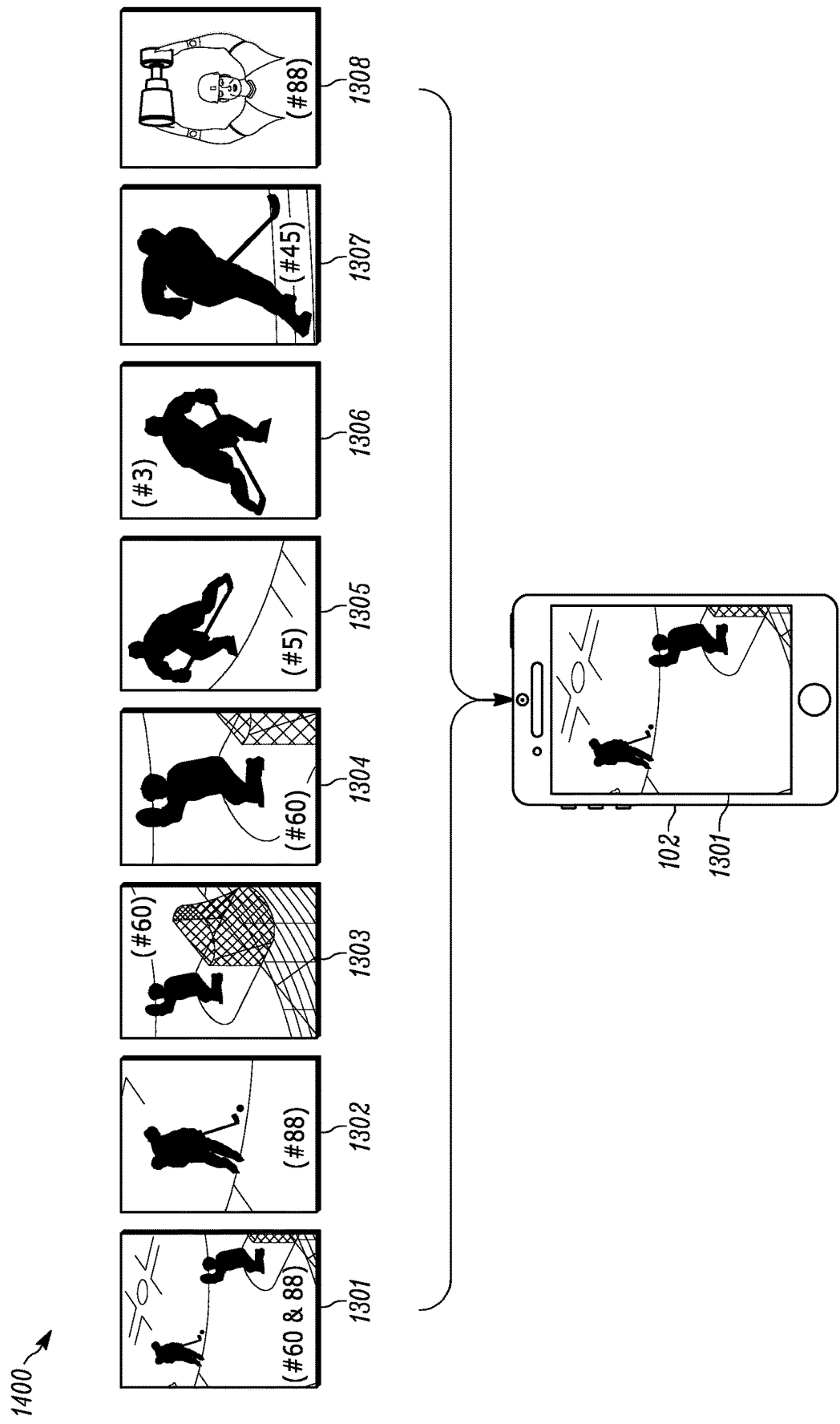
FIG. 14 is a representation of an example user interface that shows multiple stream options for display on a user device.

FIG. 14 is a representation 1400 of an example user interface 1400 shows multiple stream options 1301-1308 for display on user device 102. That is, indications of multiple options for tailored video streams are displayed. As illustrated in FIG. 14 (and also in FIG. 9), tailored video stream 1301 is selected for display. For this example, the seven regions correspond to tailored video content streams 1301-1307 of FIG. 9, plus one extra stream: player card video stream 1308 of FIG. 10. Player card video stream 1308 may be an external content stream, and may actually originate from a different source but is included by reference (such as a URL indicating a website). That is, external content stream 1308 is a reference in the primary video, perhaps a URL indicating website content. As illustrated, a region or stream may also include a label of player jersey numbers available in that particular stream. A user of a personal viewing device may select additional content by tapping the corresponding area in a composition view. The UI may store frame locations in memory and map a user selection to a corresponding content stream. For some embodiments, if a user selects a particular stream, a mobile application requests the corresponding stream from the smart TV system or a user may instead just use the default content stream selected by a smart TV (which may be selected based on user preferences or biases). For some embodiments, a user device application may use independent internet links provided in a smart TV stream to retrieve external content streams (for example, player card video stream 1308). For some embodiments, a user device application may access external providers (such as Twitter, Facebook, or Google) using information related to a presentation.

Figure 15:
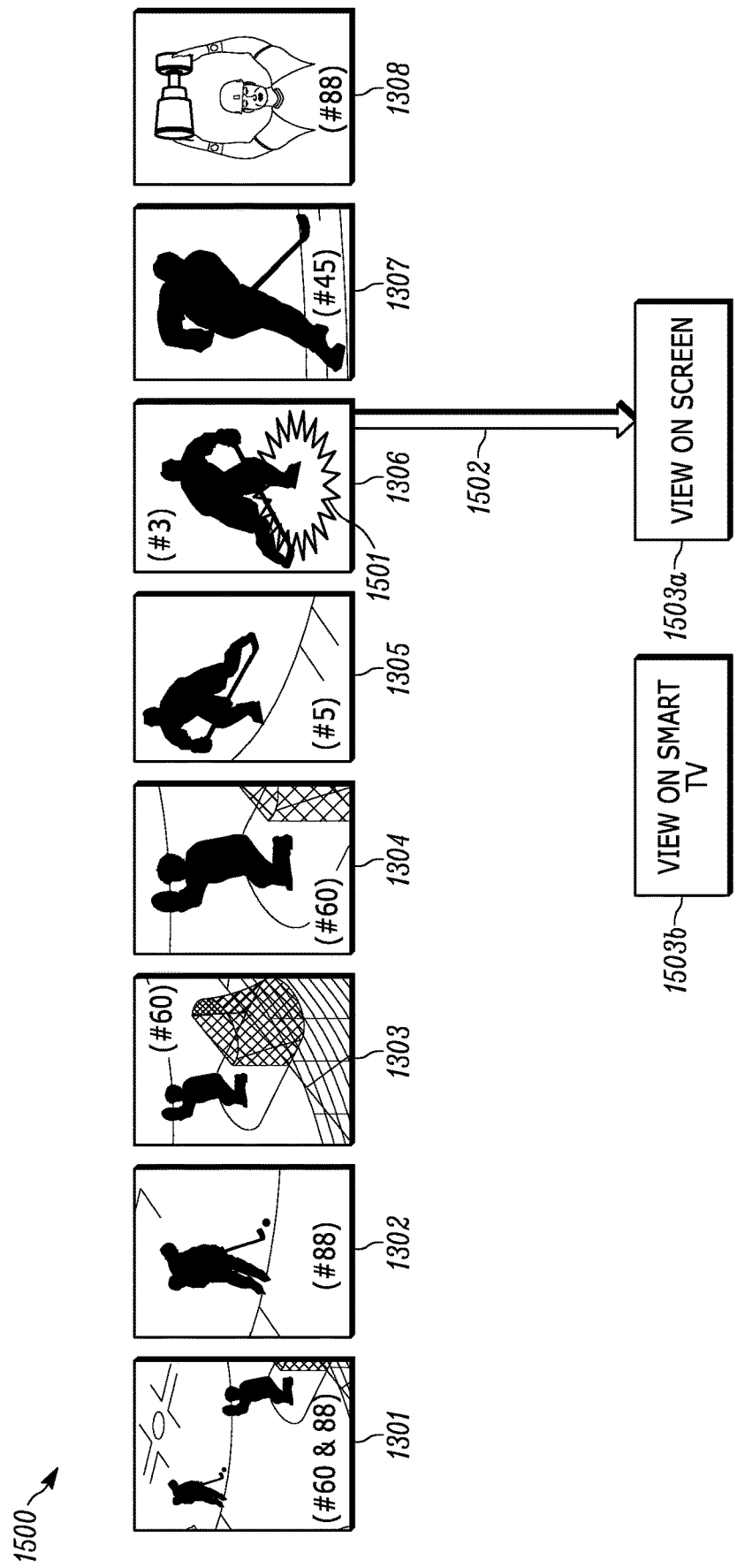
FIG. 15 is a representation of an example user interface that shows multiple stream options with additional functionality for indicating the display device.

FIG. 15 is a representation 1500 of an example user interface that shows multiple stream options with additional functionality for indicating the display device. FIG. 15 shows an example user action for selecting a source and a display. As illustrated in FIG. 15, a user may select the display on which tailored content is shown. Multiple stream options 1301-1308 are available for display, along with two device display options: personal user device 1503a (which may be similar to user device 102 mentioned previously) and smart TV 1503b (which may be similar to smart TV 101 mentioned previously). As indicated user selection 1501, representing a tap location on a touchscreen, is selecting stream 1306, which is dragged in path 1502 to an icon representing user device 1503a. By dragging the preview frame of video stream 1306 on top of an icon representing user device 1503a (or perhaps instead, an icon representing the main display of smart TV 1503b), the user may control a multi-device environment. For example, a user may select to display particular player on a user device screen by dragging the corresponding frame on top of the desired screen icon. Some embodiments may display on a user device a list of custom tailored videos. Within a mobile application user interface, a user may select a player to track (or trace).

A user selection (which may be made by tapping and dragging a stream preview frame) may be sent to a smart TV as control information. A smart TV may use the information and create a high-quality version of a corresponding content stream. Instead of a preview with coarse encoding, a smart TV may create a higher bit rate stream. The new content may be streamed over Bluetooth or Wi-Fi to a selected display. A smart TV and recommendation engine may continue to update content extraction selection. A selection preview (as shown in FIG. 15) may be sent to user devices continually to update a corresponding UI. If a user decides to change the content, the UI may display content options. For some embodiments, a user may double tab the region on interest to view the region on a user device or drag it to a desired target. Optionally, a user may select a zoomed stream for a smart TV and another stream for a user device. In some embodiments, a home button may be available on a mobile application to revert a smart TV's display to a main view and a user interface for the mobile application. Additionally, a user may change preferences (or bias) for the main view.

Exemplary Network Architecture

Figure 16:
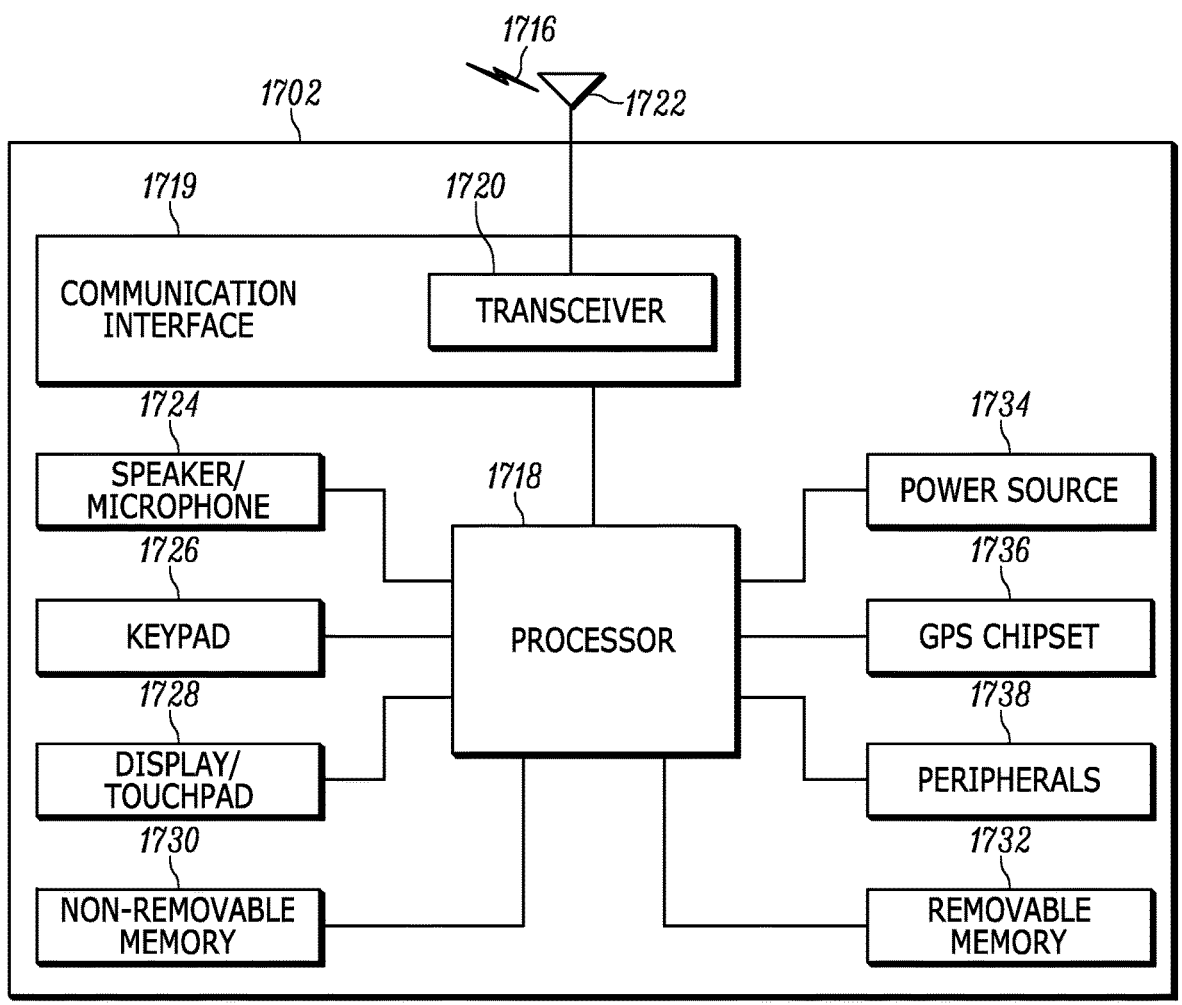
FIG. 16 depicts an example wireless transmit/receive unit (WTRU) that may be used within some embodiments.

A wireless transmit/receive unit (WTRU) may be used as a tablet or user device in embodiments described herein, for example user device 102 or 210 (of FIG. 1 or 6). FIG. 16 depicts an example WTRU 9102. WTRU 9102 may include a processor 9118, a transceiver 9120, a transmit/receive element 9122, a speaker/microphone 9124, a keypad 9126, a display/touchpad 9128, a non-removable memory 9130, a removable memory 9132, a power source 9134, a global positioning system (GPS) chipset 9136, and other peripherals 9138. The transceiver 9120 may be implemented as a component of decoder logic in communication interface 9119. For example, the transceiver 9120 and decoder logic within communication interface 9119 may be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

It will be appreciated that the WTRU 9102 may include any sub-combination of the foregoing elements while remaining consistent with an embodiment. Processor 9118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 9118 may perform signal coding, data processing, power control, input/output processing, and/or any other functionality that enables WTRU 9102 to operate in a wireless environment. Processor 9118 may be coupled to transceiver 9120, which may be coupled to transmit/receive element 9122. While FIG. 16 depicts processor 9118 and transceiver 9120 as separate components, processor 9118 and transceiver 9120 may be integrated together in an electronic package or chip.

Transmit/receive element 9122 may be configured to transmit signals to, or receive signals from, a base station over an air interface 9116. For example, in some embodiments, transmit/receive element 9122 may be an antenna configured to transmit and/or receive RF signals. In another embodiment, transmit/receive element 9122 may be an emitter/detector configured to transmit and/or receive IR, UV, or visible light signals, as examples. In yet another embodiment, transmit/receive element 9122 may be configured to transmit and receive both RF and light signals. Transmit/receive element 9122 may be configured to transmit and/or receive any combination of wireless signals.

In addition, although transmit/receive element 9122 is depicted in FIG. 16 as a single element, WTRU 9102 may include any number of transmit/receive elements 9122. More specifically, WTRU 9102 may employ MIMO technology. Thus, in some embodiments, WTRU 9102 may include two or more transmit/receive elements 9122 (e.g., multiple antennas) for transmitting and receiving wireless signals over air interface 9116. Transceiver 9120 may be configured to modulate the signals that are to be transmitted by transmit/receive element 9122 and to demodulate the signals that are received by transmit/receive element 9122. As noted above, WTRU 9102 may have multi-mode capabilities. Thus, transceiver 9120 may include multiple transceivers for enabling the WTRU 9102 to communicate via multiple RATs, such as UTRA and IEEE 802.11, as examples.

Processor 9118 of WTRU 9102 may be coupled to, and may receive user input data from, speaker/microphone 9124, keypad 9126, and/or display/touchpad 9128 (e.g., a liquid crystal display (LCD) display unit or organic light-emitting diode (OLED) display unit). Processor 9118 may also output user data to speaker/microphone 9124, keypad 9126, and/or display/touchpad 9128. In addition, processor 9118 may access information from, and store data in, any type of suitable memory, such as non-removable memory 9130 and/or removable memory 9132. Non-removable memory 9130 may include random-access memory (RAM), read-only memory (ROM), a hard disk, or any other type of memory storage device. Removable memory 9132 may include a subscriber identity module (SIM) card, a memory stick, a secure digital (SD) memory card, and the like. Non-removable memory 9130 and removable memory 9132 both comprise non-transitory computer-readable media. In other embodiments, processor 9118 may access information from, and store data in, memory that is not physically located on the WTRU 9102, such as on a server or a home computer (not shown).

Processor 9118 may receive power from power source 9134, and may be configured to distribute and/or control the power to the other components in WTRU 9102. Power source 9134 may be any suitable device for powering WTRU 9102. As examples, power source 9134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like. Processor 9118 may also be coupled to GPS chipset 9136, which may be configured to provide location information (e.g., longitude and latitude) regarding the current location of WTRU 9102. In addition to, or in lieu of, the information from GPS chipset 9136, WTRU 9102 may receive location information over air interface 9116 from a base station and/or determine its location based on the timing of the signals being received from two or more nearby base stations. WTRU 9102 may acquire location information by way of any suitable location-determination method while remaining consistent with an embodiment.

Processor 9118 may further be coupled to other peripherals 9138, which may include one or more software and/or hardware modules that provide additional features, functionality and/or wired or wireless connectivity. For example, peripherals 9138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 17:
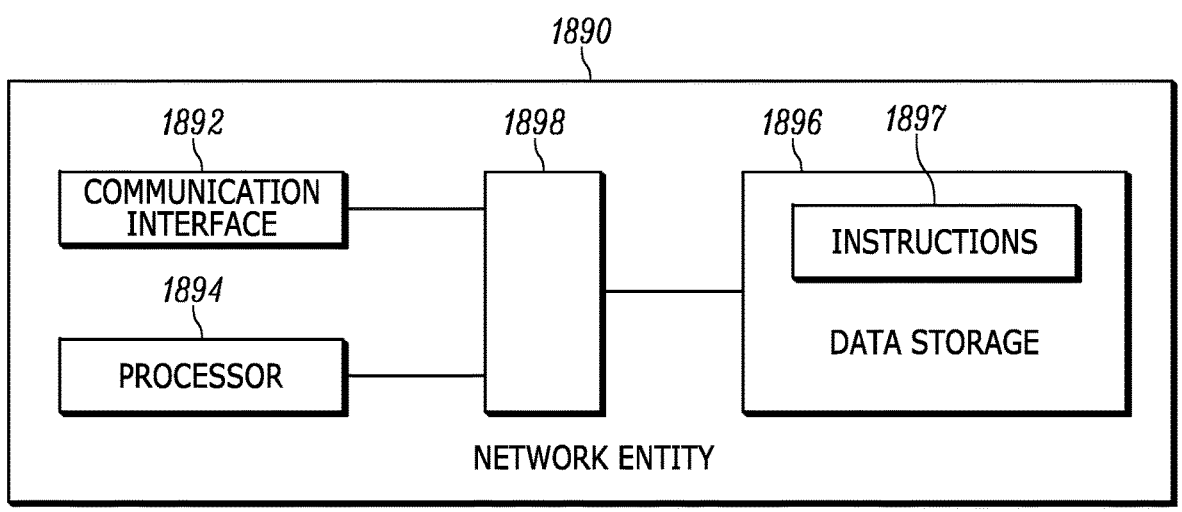
FIG. 17 depicts an exemplary network entity that may be used within a communication system.

FIG. 17 depicts an exemplary network entity 9190 that may be used within embodiments of systems described herein. As depicted in FIG. 17, a network entity 9190 includes a communication interface 9192, a processor 9194, and non-transitory data storage 9196, all of which are communicatively linked by a bus, network, or other communication path 9198.

Communication interface 9192 may include one or more wired communication interfaces and/or one or more wireless-communication interfaces. With respect to wired communication, communication interface 9192 may include one or more interfaces such as Ethernet interfaces, as an example. With respect to wireless communication, communication interface 9192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 9192 may be equipped at a scale and with a configuration appropriate for acting on the network side, rather than the client side, of wireless communications (e.g., LTE communications, Wi-Fi communications, and the like). Thus, communication interface 9192 may include the appropriate equipment and circuitry (including multiple transceivers) for serving multiple mobile stations, UEs, or other access terminals in a coverage area.

Processor 9194 may include one or more processors of any type deemed suitable by those of skill in the relevant art, some examples including a general-purpose microprocessor and a dedicated DSP. Data storage 9196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art may be used. As depicted in FIG. 17, data storage 9196 contains program instructions 9197 executable by processor 9194 for carrying out various combinations of the various network-entity functions described herein.

In some embodiments, network-entity functions described herein may be carried out by a network entity having a structure similar to that of network entity 9190 of FIG. 17. In some embodiments, one or more of such functions are carried out by a set of multiple network entities in combination, where each network entity has a structure similar to that of network entity 9190 of FIG. 17. And certainly other network entities and/or combinations of network entities may be used in various embodiments for carrying out the network-entity functions described herein, as the foregoing list is provided by way of example and not by way of limitation.

Note that various hardware elements of one or more of the described embodiments are referred to as "modules" that carry out (perform or execute) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and those instructions may take the form of or include hardware (hardwired) instructions, firmware instructions, software instructions, and/or the like, and may be stored in any suitable non-transitory computer-readable medium or media, such as commonly referred to as RAM or ROM.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method of sharing media, the method comprising:
   receiving, at a primary display device, an encoded video stream;
   receiving, at the primary display device, metadata identifying a plurality of tracked objects or regions in the encoded video stream;
   decoding the encoded video stream and displaying the decoded video stream at the primary display device;
   generating options to request additional viewpoints corresponding to one or more of the plurality of tracked objects or regions, the options generated based on the metadata;
   transmitting the options to a secondary display device;
   receiving, at the primary display device, a request for a viewpoint corresponding to a tracked object or region selected from the plurality of tracked objects or regions in the decoded video stream; and
   responsive to the request:
      cropping the tracked object or region of the requested viewpoint from the decoded video stream to produce cropped video of the requested viewpoint;
      re-encoding the cropped video; and
      transmitting the re-encoded cropped video to the secondary display device.

2. The method of claim 1, wherein the re-encoded cropped video has a different resolution than the encoded video stream received.

3. The method of claim 1, wherein transmitting the re-encoded cropped video comprises transmitting the re-encoded cropped video over a wireless local area network (LAN).

4. The method of claim 1, wherein transmitting the re-encoded cropped video comprises transmitting the re-encoded cropped video using at least one of Universal Plug and Play (UPnP) protocol or Digital Living Network Alliance (DLNA) protocol.

5. The method of claim 1, wherein transmitting the re-encoded cropped video comprises transmitting the re-encoded cropped video with digital rights management (DRM) security protections.

6. The method of claim 1, wherein the primary display device comprises at least one selected from the list consisting of: a smart TV, a set top box (STB), and a video hub.

7. The method of claim 1, further comprising:
   receiving, at the primary display device from a third display device, a second request for a second viewpoint corresponding to a second tracked object or region selected from the plurality of tracked objects or regions in the video stream; and
   responsive to the second request:
      cropping the second tracked object or region of the second requested viewpoint from the decoded video stream to produce a second cropped video of the second requested viewpoint;
      re-encoding the second cropped video; and
      transmitting the re-encoded second cropped video to the secondary display device.

8. The method of claim 7, wherein the second cropped video comprises an external content stream reference.

9. The method of claim 1, further comprising:
   at the primary display device, extracting a second region of interest from the video stream received,
   wherein transmitting the options comprises transmitting an option for a cropped video cropped to the second region of interest.

10. The method of claim 1, further comprising:
    receiving, at the primary display device from the secondary display device, information related to local context or user preferences; and
    responsive to receiving the information related to local context or user preferences, recommending at least one option of the options generated.

11. The method of claim 10, further comprising:
    creating a user profile from the information related to local context or user preferences,
    wherein recommending the at least one option comprises using the user profile to recommend the at least one option.

12. The method of claim 10, further comprising:
    responsive to receiving the information related to local context or user preferences, limiting a number of options to request additional viewpoints.

13. The method of claim 1, further comprising:
receiving, at the primary display device from the secondary display device, a request to follow a traced object,
wherein the cropped video comprises a cropped portion of the video stream received that includes the traced object.

14. A system comprising:
a receiver;
a display;
a processor; and
a non-transitory computer-readable medium storing instructions operative, when executed by the processor, to cause the system to:
receive an encoded video stream;
receive metadata identifying a plurality of tracked objects or regions in the encoded video stream;
decode the encoded video stream and display the decoded video stream at the primary display device;
generate options to request additional viewpoints corresponding to one or more of the plurality of tracked objects or regions, the options generated based on the metadata;
transmit the options to a secondary display device;
receive request for a viewpoint corresponding to a tracked object or region selected from the plurality of tracked objects or regions in the decoded video stream; and
responsive to the request:
crop the tracked object or region of the requested viewpoint from the decoded video stream to produce cropped video of the requested viewpoint;
re-encode the cropped video; and
transmit the re-encoded cropped video to the secondary display device.

15. A method of sharing media, the method comprising:
receiving, at a primary display device, an encoded video stream;
receiving, at the primary display device, metadata identifying a plurality of tracked objects or regions in the encoded video stream;
decoding the encoded video stream and displaying the decoded video stream at the primary display device;
generating options to request additional viewpoints corresponding to one or more of the plurality of tracked objects or regions, the options generated based on the metadata;

recommending at least one option of the options generated;
receiving, at the primary display device, a request for a viewpoint corresponding to a tracked object or region selected from the plurality of tracked objects or regions in the decoded video stream; and
responsive to the request:
cropping the tracked object or region of the requested viewpoint from the decoded video stream to produce cropped video of the requested viewpoint;
re-encoding the cropped video; and
transmitting the re-encoded cropped video.

16. The method of claim 15,
wherein recommending at least one option of the options generated comprises transmitting a recommendation to a secondary display device, and
wherein transmitting the re-encoded cropped video comprises transmitting the re-encoded cropped video to the secondary display device.

17. The method of claim 15, further comprising:
receiving, at the primary display device from the secondary display device, information related to local context or user preferences,
wherein recommending the at least one option of the options generated is responsive to receiving the information related to local context or user preferences.

18. The method of claim 17, further comprising:
creating a user profile from the information related to local context or user preferences,
wherein recommending the at least one option comprises using the user profile to recommend the at least one option.

19. The method of claim 17, further comprising:
responsive to receiving the information related to local context or user preferences, limiting a number of options to request additional viewpoints.

20. The method of claim 15, further comprising:
receiving, at the primary display device from the secondary display device, a request to follow a traced object,
wherein the cropped video comprises a cropped portion of the video stream received that includes the traced object.

* * * * *